United States Patent [19]

Yamato et al.

[11] Patent Number: 5,694,390
[45] Date of Patent: Dec. 2, 1997

[54] METHOD AND APPARATUS FOR CONTROLLING CONGESTION IN COMMUNICATION NETWORK

[75] Inventors: Katsumi Yamato, Saitama-ken; Hiroshi Esaki, Kanagawa-ken, both of Japan

[73] Assignee: Kabushiki Kaisha Toshiba, Kawasaki, Japan

[21] Appl. No.: 301,275

[22] Filed: Sep. 6, 1994

[30] Foreign Application Priority Data

Sep. 6, 1993 [JP] Japan .................................. 5-220359
Dec. 27, 1993 [JP] Japan .................................. 5-348538

[51] Int. Cl.$^6$ ........................................................ H04J 3/14
[52] U.S. Cl. ........................ 370/230; 370/236; 370/232; 370/253; 370/396
[58] Field of Search .................................. 370/17, 13, 14, 370/58.1, 58.2, 60, 60.1, 61, 68.1, 79, 84, 94.1, 94.3, 99, 110.1, 229–236, 249, 252, 253, 389, 395, 396, 400, 465, 474; 340/825, 825.06, 825.07, 825.02

[56] References Cited

U.S. PATENT DOCUMENTS

| | | | |
|---|---|---|---|
| 5,029,164 | 7/1991 | Goldstein et al. | 370/235 |
| 5,040,171 | 8/1991 | Osaki | 370/232 |
| 5,042,029 | 8/1991 | Hayakawa | 370/231 |
| 5,119,372 | 6/1992 | Verbeek | 370/230 |
| 5,243,596 | 9/1993 | Port et al. | 370/236 |
| 5,280,470 | 1/1994 | Buhrke et al. | 370/232 |
| 5,309,431 | 5/1994 | Tominaga et al. | 370/235 |
| 5,313,454 | 5/1994 | Bustini et al. | 370/236 |
| 5,319,638 | 6/1994 | Lin | 370/235 |
| 5,394,408 | 2/1995 | Nishihara et al. | 370/395 |
| 5,400,329 | 3/1995 | Tokura et al. | 370/232 |
| 5,414,697 | 5/1995 | Osaki | 370/236 |
| 5,432,824 | 7/1995 | Zheng et al. | 370/232 |
| 5,446,726 | 8/1995 | Rostoker et al. | 370/232 |
| 5,457,687 | 10/1995 | Newman | 370/232 |
| 5,519,689 | 5/1996 | Kim | 370/232 |
| 5,550,808 | 8/1996 | Shimokoshi | 370/230 |

FOREIGN PATENT DOCUMENTS

| | | |
|---|---|---|
| 0 448 073 | 9/1991 | European Pat. Off. . |
| 0 487 235 | 5/1992 | European Pat. Off. . |

OTHER PUBLICATIONS

Inai, Hiroshi et al., "Rate–Based Congestion Control in High Speed Packet–Switching Networks", *IEICE Trans. Commun.*, vol. E75–B, No. 11, Nov. 1992, pp. 1199–1207.

Chao, H. Jonathan, "A General Architecture for Link–Layer Congestion Control in ATM Networks" *International Switching Symposium*, vol. 1, Oct. 25, 1992, pp. 229–233.

Gerla, Mario et al., "Congestion Control in Interconnected LANs", *IEEE Network: The Magazine of Computer Communications*, vol. 2, No. 1, Jan. 1988, pp. 72–76.

Makrucki, "On the Performance of Submitting Excess Traffic to ATM Networks," *IEEE Global Telecommunications Conference*, vol. 1, Dec. 2, 1991, pp. 281–288.

Saunders, "ATM Forum Ponders Congestion Control Options," *Data Communications*, vol. 23, No. 4, Mar. 23, 1994, pp. 55–58.

(List continued on next page.)

*Primary Examiner*—Alpus H. Hsu
*Assistant Examiner*—Seema S. Rao
*Attorney, Agent, or Firm*—Foley & Lardner

[57] ABSTRACT

A scheme for controlling a congestion in the communication network, capable of realizing a recovery from the congestion state by the operation at the lower layer level for the communication data transfer alone, without relying on the upper layer protocol to be defined at the terminals. In a communication network including first and second node systems, a flow of communication data transmitted from the first node system to the second node system is monitored and regulated by using a monitoring parameter. On the other hand, an occurrence of congestion in the second node system is detected according to communication data transmitted from the second node system, and the monitoring parameter used in monitoring and regulating the flow of communication data is changed according to a detection of the occurrence of congestion in the second node system.

64 Claims, 22 Drawing Sheets

OTHER PUBLICATIONS

"Traffic Control and Congestion Control in B-ISDN," ITU-T Recommendation I.371, 1993, pp. 1-26.

D. Hunt et al, "Credit-Based FCVC Proposal for ATM Traffic Management," ATM Forum Technical Committee 94-0168R1, May 1994.

L. Roberts et al., "Closed-Loop Rate-Based Traffic Management," ATM Forum Technical Committee 94-0438R1, Jul. 1994.

Kowalk et al., "The 'Policing Function' to Control User Access in ATM Networks—Definition and Implementation . . . ", IEEE, 1988, pp. 0240-0245.

ATM Theory & Applications David E. McDysan & Darren L. Spohn.

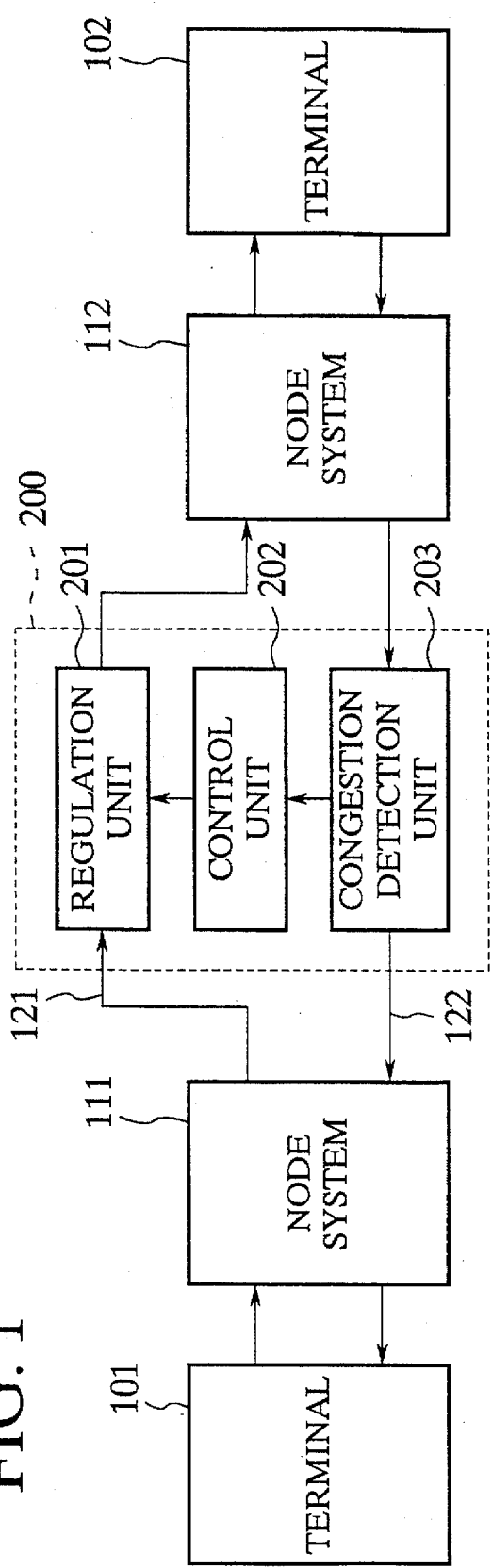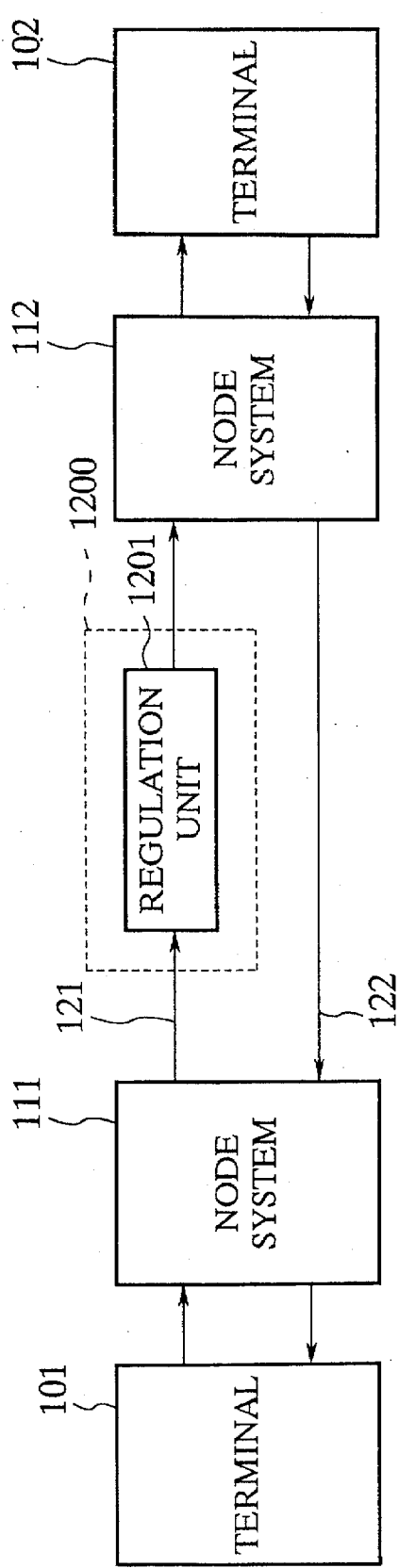
FIG. 1
FIG. 2 PRIOR ART

| ADDRESS | MONITORING PARAMETER |
|---------|----------------------|
| 0 | P (0) |
| 1 | P (1) |
| ⋮ | ⋮ |
| adr-1 | P (adr-1) |
| adr | P (adr) |
| adr+1 | P (adr+1) |
| ⋮ | ⋮ |

1

METHOD AND APPARATUS FOR CONTROLLING CONGESTION IN COMMUNICATION NETWORK

BACKGROUND OF THE INVENTION

1. Field of the Invention

The present invention relates to a scheme for controlling a congestion in a communication network such as an ATM (Asynchronous Transfer Mode) network.

2. Description of the Background Art

In operating the communication network, the communication network can fall into a congestion state when the communication data exceeding the processing capacity of the communication network are concentrated onto one node system constituting the communication network due to the occurrence of an unpredictable fluctuation in the communication data flow or a fault condition in the network. In this congestion state, the terminal utilizing the communication network cannot receive the service requested to the network in advance, so that there is a need to carry out the congestion control at the communication network in order to recover from the congestion state such that the intensity, the spread, and the duration of the congestion state can be minimized.

As a scheme for such a congestion control, in the ATM network for example, the controlling to discard the cells with low cell loss priority level at the network side is recommended. Also, in the frame relay, the occurrence of the congestion is explicitly notified to the terminal from the system fallen into the congestion state such that the terminal side can recognize the occurrence of the congestion on the network side and the controlling to lower the transmission speed of the communication data such as the window flow control or the rate control can be carried out at the terminal side.

However, in a case of the controlling to discard the cells with low cell loss priority level at the network side as in the ATM network, it can be expected for the recovery from the congestion state to require a considerable amount of time, considering the fact that the cells are continuously flowing into the network. On the other hand, in a case of the controlling to lower the transmission speed of the communication data at the terminal side using the explicit congestion notice as in the frame relay, although the significant effect at the communication network side can be expected, this scheme requires the special upper layer protocol definition for its purpose. In addition, in this scheme, in conjunction with the lowering of the transmission speed, there is a possibility for the occurrence of the overflow at the buffer provided within the terminal. Furthermore, in this scheme, the control of the congestion totally relies on the controlling to be carried out at the terminal side, so that there is a possibility for the communication network to fail to recover from the congestion state.

Moreover, when the priority service is provided by the communication network, there is a need to provide a controlling to maintain the required service level for the high priority services even in the congestion state.

SUMMARY OF THE INVENTION

It is therefore an object of the present invention to provide a method and an apparatus for controlling a congestion in the communication network, capable of realizing a recovery from the congestion state by the operation at the lower layer level for the communication data transfer alone, without relying on the upper layer protocol to be defined at the terminals.

According to one aspect of the present invention there is provided a method for controlling congestion in communication network formed by a plurality of node systems including first and second node systems, comprising the steps of: monitoring and regulating flow of communication data transmitted from the first node system to the second node system by using a monitoring parameter; detecting an occurrence of congestion in the second node system according to communication data transmitted from the second node system; and changing the monitoring parameter used at the monitoring and regulating step according to a detection of the occurrence of congestion in the second node system at the detecting step.

According to another aspect of the present invention there is provided an apparatus for controlling congestion in communication network formed by a plurality of node systems including first and second node systems, comprising: monitoring and regulating means for monitoring and regulating a flow of communication data transmitted from the first node system to the second node system by using a monitoring parameter; congestion detection means for detecting an occurrence of congestion in the second node system according to communication data transmitted from the second node system; and control means for changing the monitoring parameter used in the monitoring and regulation means according to a detection of the occurrence of congestion in the second node system by the congestion detection means.

According to another aspect of the present invention there is provided a method for controlling congestion in communication network connected with a terminal, comprising the steps of: monitoring and regulating a flow of communication data transmitted from the terminal to the communication network by using a monitoring parameter; detecting an occurrence of congestion in the communication network according to communication data transmitted from the communication network; and changing the monitoring parameter used at the monitoring and regulating step according to a detection of the occurrence of congestion in the communication network at the detecting step.

According to another aspect of the present invention there is provided an apparatus for controlling congestion in communication network connected with a terminal, comprising: monitoring and regulating means for monitoring and regulating a flow of communication data transmitted from the terminal to the communication network by using a monitoring parameter; congestion detection means for detecting an occurrence of congestion in the communication network according to communication data transmitted from the communication network; and control means for changing the monitoring parameter used in the monitoring and regulation means according to a detection of the occurrence of congestion in the communication network by the congestion detection means.

According to another aspect of the present invention there is provided a method for controlling congestion in communication network formed by a plurality of node systems including first and second node systems, comprising the steps of: monitoring and regulating a flow of communication data transmitted from the first node system to the second node system by using a monitoring parameter; detecting an occurrence of congestion in the second node system according to an amount of communication data stored in a buffer for temporarily storing the communication data transmitted to the second node system; and changing the monitoring parameter used at the monitoring and regulating step according to a detection of the occurrence of congestion in the second node system at the detecting step.

According to another aspect of the present invention there is provided an apparatus for controlling congestion in communication network formed by a plurality of node systems including first and second node systems, comprising: monitoring and regulating means for monitoring and regulating a flow of communication data transmitted from the first node system to the second node system by using a monitoring parameter; congestion detection means for detecting an occurrence of congestion in the second node system according to an amount of communication data stored in a buffer for temporarily storing the communication data transmitted to the second node system; and control means for changing the monitoring parameter used in the monitoring and regulating means according to a detection of the occurrence of congestion in the Second node system by the congestion detection means.

According to another aspect of the present invention there is provided a method for controlling congestion in communication network formed by a plurality of node systems including first, second, and third node systems, comprising the steps of: monitoring and regulating a flow of communication data transmitted from the first node system to the second node system by using a monitoring parameter; detecting an occurrence of congestion in the second node system according to a backward congestion notice provided in the communication data flowing out from the second node system to the first node system; changing the monitoring parameter used at the monitoring and regulating step according to a detection of the occurrence of congestion in the second node system at the detecting step; detecting a forward congestion notice provided in the communication data transmitted from the second node system to the third node system when the congestion occurs in the second node system; and generating the backward congestion notice, indicating the occurrence of congestion in the second node system, in the communication data transmitted from the third node system to the first and second node systems, according to the detected forward congestion notice.

According to another aspect of the present invention there is provided an apparatus for controlling congestion in communication network formed by a plurality of node systems including first, second, and third node systems, comprising: a first regulation unit provided between the first and second node systems, including: monitoring and regulating means for monitoring and regulating a flow of communication data transmitted from the first node system to the second node system by using a monitoring parameter; congestion detection means for detecting an occurrence of congestion in the second node system according to a backward congestion notice provided in the communication data flowing out from the second node system to the first node system; and control means for changing the monitoring parameter used in the monitoring and regulating means according to a detection of the occurrence of congestion in the second node system by the congestion detection means; and a second regulation unit provided between the second and third node systems, including: forward congestion notice detection means for detecting a forward congestion notice provided in the communication data transmitted from the second node system to the third node system when the congestion occurs in the second node system; and backward congestion notice generation means for generating the backward congestion notice, indicating the occurrence of congestion in the second node system, in the communication data transmitted from the third node system to the first and second node systems, according to the forward congestion notice detected by the forward congestion notice detection means.

Other features and advantages of the present invention will become apparent from the following description taken in conjunction with the accompanying drawings.

BRIEF DESCRIPTION OF THE DRAWINGS

FIG. 1 is a schematic block diagram of the first embodiment of a communication system according to the present invention.

FIG. 2 is a schematic block diagram of a conventional communication system corresponding to the communication system of FIG. 1.

DETAILED DESCRIPTION OF THE PREFERRED EMBODIMENTS

Figure 3:
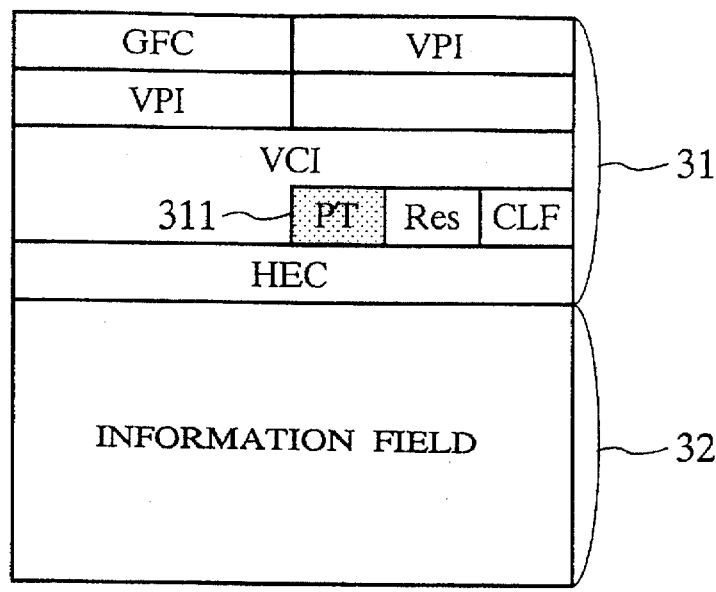
FIG. 3 is a data structure of a cell used in the communication system of FIGS. 1 and 2.

Now, the embodiments of the method and the apparatus for controlling a congestion in the communication network according to the present invention will be described in detail. In the following, a case of applying the present invention to the ATM network will be described as a concrete example. In the ATM network, the communication data generated from the terminal are transmitted and exchanged in units of blocks with fixed length called cells. Also, in this case, the connection described in the following can be either the virtual channel connection (VCC) or the virtual path connection (VPC) in the ATM network.

First, the communication system in the first embodiment of the present invention has a schematic configuration as shown in FIG. 1, which comprises terminals 101 and 102, node systems 111 and 112 such as the ATM exchangers connected with the terminals 101 and 102, respectively, and a cell traffic regulation unit 200 connected between the node systems 111 and 112.

The cell traffic regulation unit 200 has a regulation unit 201 for monitoring the cell flowing into the node system 112 through a connection 121, a control unit 202 for controlling the regulation unit 201 to regulate the cell flow on the connection 121, and a congestion detection unit 203 for detecting the occurrence of the congestion in the node system 112 by monitoring the cell flowing out from the node system 112 through a connection 122. This cell traffic regulation unit 200 is to be attached at any connection in the ATM network for which the monitoring is desired.

In contrast, FIG. 2 shows a schematic configuration of the conventional communication system in the corresponding set up, which has a cell traffic regulation unit 1200 including only a regulation unit 1201 for monitoring the cell flowing through the connection 121.

In the communication system of FIG. 1 or FIG. 2, at a time of setting up the connection in the ATM network, the terminal intending to use that connection requests to the network side the quality of service for the cell traffic to be communicated through that connection in advance, and the network side permits the set up of that connection when it is possible to provide the service within a range satisfying the requested quality of service.

Here, for example, the content of the quality of service to be requested by the terminal can include:

(1) an upper limit value for the cell transmission rate (that is, a minimum value for the consecutive cell transmission time interval), (2) an upper limit value for an average cell transmission rate of cell within a certain period of time (that is, a maximum value for a number of cells transferrable within a certain period of time), and (3) a maximum burst size (that is, a number of cells that can be transmitted consecutively at the cell transmission rate equal to the upper limit value).

It is to be noted that, in a case of setting up the connection which does not require any quality of service in the ATM network, there is no need to request the quality of service to the network.

In a case of monitoring and regulating the connection within the ATM network, in the communication system of FIG. 1 or FIG. 2, the quality of service for the cell traffic belonging to the connection 121 is set up in the cell traffic regulation unit 200 or 1200 as a monitoring parameter for the cell traffic to be transferred through the connection 121 in the cell traffic regulation unit 200 or 1200. Then, the cell traffic regulation unit 200 or 1200 monitors the cell traffic actually transferred through the connection 121, and in a case of the cell transfer in violation to the monitoring parameter, the transferred cell is judged as the violation cell at the regulation unit 201 or 1201 and regulated accordingly. More specifically, the scheme for regulating the violation cell can be (1) a scheme for immediately discarding the violation cell without allowing it to flow into the node system 112, or (2) a scheme for buffering the violation cell to delay it until the monitoring parameter is satisfied and then allowing it to flow into the node system 112.

Here, in the conventional communication system of FIG. 2, the following problem arises.

Namely, consider a case in which the node system has fallen into the congestion state. Here, the congestion state is defined as a state in which the quality of service requested in advance for each connection within the network cannot be provided due to the occurrence of an unpredictable fluctuation in the traffic flow or a fault condition in the network, or a large cell flow from the connection belonging to the service class which requires no request of the quality of service from the terminal to the network at a time of setting up the connection such as the ABR (Available Bit Rate) service class. Then, the judgement as to whether it is in the congestion state or not is made by constantly monitoring the cell storage amount or the variation of the cell storage amount of a buffer provided in the node system within the network for exchanging and transmitting cells for the purpose of temporarily storing cells at that node system, for example. At the node system 112, in order to recover from the congestion state, the controlling to selectively discard those cells among the cells stored in the overflowing buffer within the node system 112 which have a lower cell loss priority (that is those cells with the CLP bit equal to 1) is carried out.

However, the node system 111 cannot recognize the fact that the node system 112 has fallen into the congestion state, so that the node system 111 continues to transmit the cells with respect to the node system 112 using the connection 121 as usual. As a result, the number of cells stored in the node system 112 does not decrease, and consequently the recovery from the congestion state cannot be realized quickly.

Now, each cell used in this first embodiment has a structure as shown in FIG. 3, which comprises a header 31 formed by 5 octets, and an information field 32 formed by 48 octets. According to the CCITT I.371, there is provided an optional feature of the controlling to set up an EFCI (Explicit Forward Congestion Indication) in the payload type field (PT) 311 in the header 31 of the cell by the structural element of the network which has fallen into the congestion state. This optional feature is expected to be used in such a manner that the cell in which this EFCI is set up is transferred to the destination terminal indicated in its header such that the terminal recognizes the fact that the network has fallen into the congestion state at a time the cell is handed over to the upper layer.

In the communication system of FIG. 1, in a case the node system 112 has fallen into the congestion state, the above described EFCI is set up with respect to the header of the cell transmitted through the node system 112. Then, in this first embodiment, the presence or absence of the EFCI setting in the cell transmitted from the node system 112 through the connection 122 to the terminal is checked by the congestion detection unit 203 in the cell traffic regulation unit 200, such that the cell traffic regulation unit 200 can recognize whether the node system 112 is in the congestion state or not. Here, the connection 122 is such a connection that the cells belonging to it are the cells transferred in a direction opposite to the transfer direction of the cells belonging to the connection 121 on which the monitoring and controlling are carried out, but it is also possible to recognize the occurrence of the congestion state in the node system 112 according to the internal data of the cell belonging to the connection connected to the node system 112 other than this connection 122.

In addition, the control unit 202 of the cell traffic regulation unit 200 has a monitoring parameter changing function for changing the monitoring parameter used at the regulation unit 201, such that when the node system 112 is judged to be in the congestion state at the congestion detection unit 203, the monitoring parameter used for the monitoring at the regulation unit 201 is changed by this monitoring parameter changing function to a new monitoring parameter by which the number of cells flowing into the network can be reduced compared with the previous monitoring parameter, and the monitoring of the cells belonging to the connection 121 is continued with this new monitoring parameter. By means of this, the number of cells flowing into the node system 112 through the connection 121 is reduced in order to circumvent the buffer overflow, and as a result, it becomes possible to expect the quick recovery from the congestion state for the node system 112.

When the node system 112 is recovered from the congestion state by means of the above described controlling, the EFCI is not going to be set up in the header of the cell transmitted from the node system 112, so that it is possible for the cell traffic regulation unit 200 to judge that the node system 200 is not in the congestion state. In such a case, by using the monitoring parameter changing function of the control unit 202, the monitoring parameter used for the monitoring at the regulation unit 201 is changed to a new monitoring parameter by which the number of cells flowing into the network can be increased, compared with the previous monitoring parameter, and the monitoring of the cells belonging to the connection 121 is continued with this new monitoring parameter. By means of this, the connection which has been monitored by the monitoring parameter which is more restrictive than the requested parameter because of the occurrence of the congestion in the network can resume the service according to the requested parameter in conjunction with the recovery from the congestion of the network.

In the above described case, the EFCI field which has originally been provided for the purpose of the congestion notification with respect to the receiver terminal 102 is utilized for the purpose of the congestion notification with respect to the source terminal 101 in conjunction with the cell traffic regulation unit 200 which is located at the sender terminal 101 side when viewed from the node system 112 which has fallen into the congestion state. Alternatively, it is also possible to use a scheme in which the new field for explicitly notifying the congestion state of the node system with respect to the sender terminal is provided within the cell apart from the EFCI field such that the node system which has fallen into the congestion state sets up the the backward congestion notification identifier in the newly provided field within the cell transmitted to the sender terminal through this node system, and the cell traffic regulation unit recognizes the occurrence of the congestion state according to this backward congestion notification identifier.

Similarly, it is also possible use a scheme in which the control cell for the purpose of the congestion notification is newly generated at the node system which has fallen into the congestion state and transmitted to the sender terminal such that the cell traffic regulation unit recognizes the occurrence of the congestion state according to this control cell. Here, the control cell can be realized by the OAM F4 flow cell or the OAM F5 flow cell for example. In the following, a case using the EFCI for the congestion notification to the sender terminal will be described in detail, but it should be understood that the EFCI in the following description can be replaced by the backward congestion notification identifier or the control cell for the purpose of the congestion notification as described above.

Also, it is possible to use a scheme in which the monitoring parameter after the changing is notified to the sender terminal whenever the monitoring parameter is changed at the cell traffic regulation unit. Namely, this can be realized by newly generating a control cell for the purpose of notifying the monitoring parameter at the cell traffic regulation unit 200 and transferring this newly generated control cell to the sender terminal, or in a case the congestion notification to the cell traffic regulation unit 200 is made by the control cell, by registering the monitoring parameter value into this control cell at the cell traffic regulation unit 200 and transferring this control cell to the sender terminal. In this scheme, the monitoring parameter currently used at the cell traffic regulation unit 200 can be recognized at the sender terminal, so that the sender terminal can change the data transmission rate in view of the changed monitoring parameter value, and it becomes possible to expect the reduction of the number of cells discarded in conjunction with the congestion control.

Figure 4:
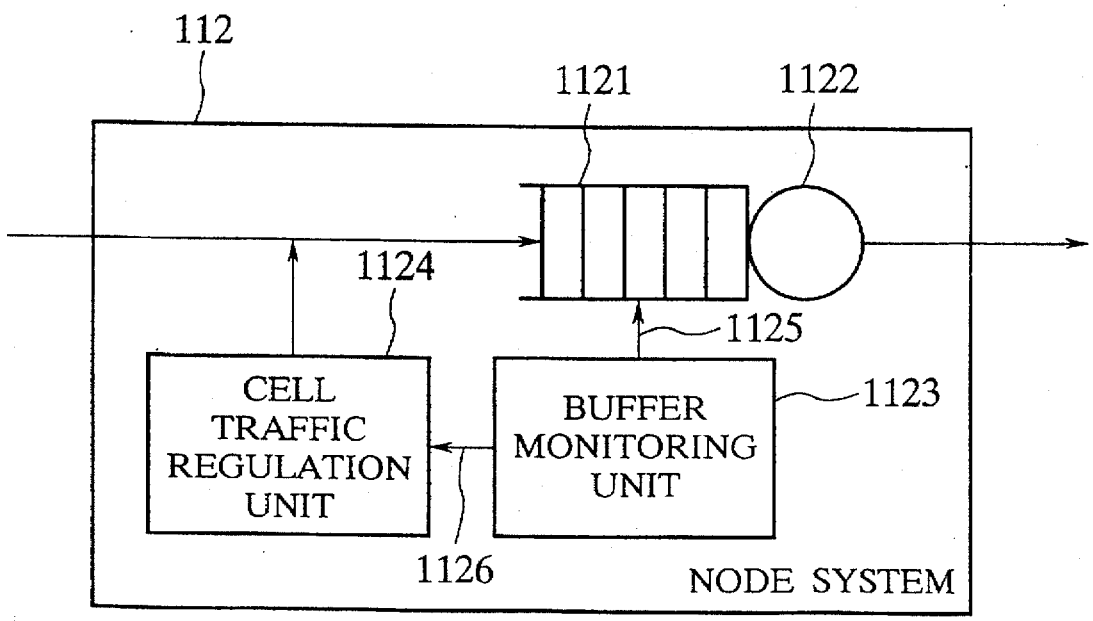
FIG. 4 is a schematic configuration of a node system that can be used in the communication system of FIG. 1, which incorporates a cell traffic regulation unit therein.

FIG. 1 described above has been a configuration in which the node system 112 and the cell traffic regulation unit 200 for monitoring and regulating the cells flowing into this node system 112 are provided separately, but it is also possible to incorporate the cell traffic regulation unit inside the node system as shown in FIG. 4. In this configuration of FIG. 4, the node system 112 includes a buffer 1121 for temporarily storing the cells arrived at the node system 112, an ATM switch 1122 for taking out each cell stored in the buffer 1121 and exchanging and transmitting the cell to the destination address specified within each cell, a buffer monitoring unit 1123 for constantly monitoring the number of cells stored in the buffer 1121 through monitoring line 1125 and generating a congestion indication signal 1126 for notifying the occurrence of the congestion whenever it is judged that the congestion is going to occur according to the result of the monitoring through the monitoring line 1125, and a cell traffic regulation unit 1124 for monitoring a number of cells flowing into the node system 112 and regulating the violation cells. Here, the congestion indication signal 1126 generated by the buffer monitoring unit 1123 is directly supplied to the cell traffic regulation unit 1124 such that the cell traffic regulation unit 1124 can change the monitoring parameter according to this congestion indication signal 1126.

Figure 5:
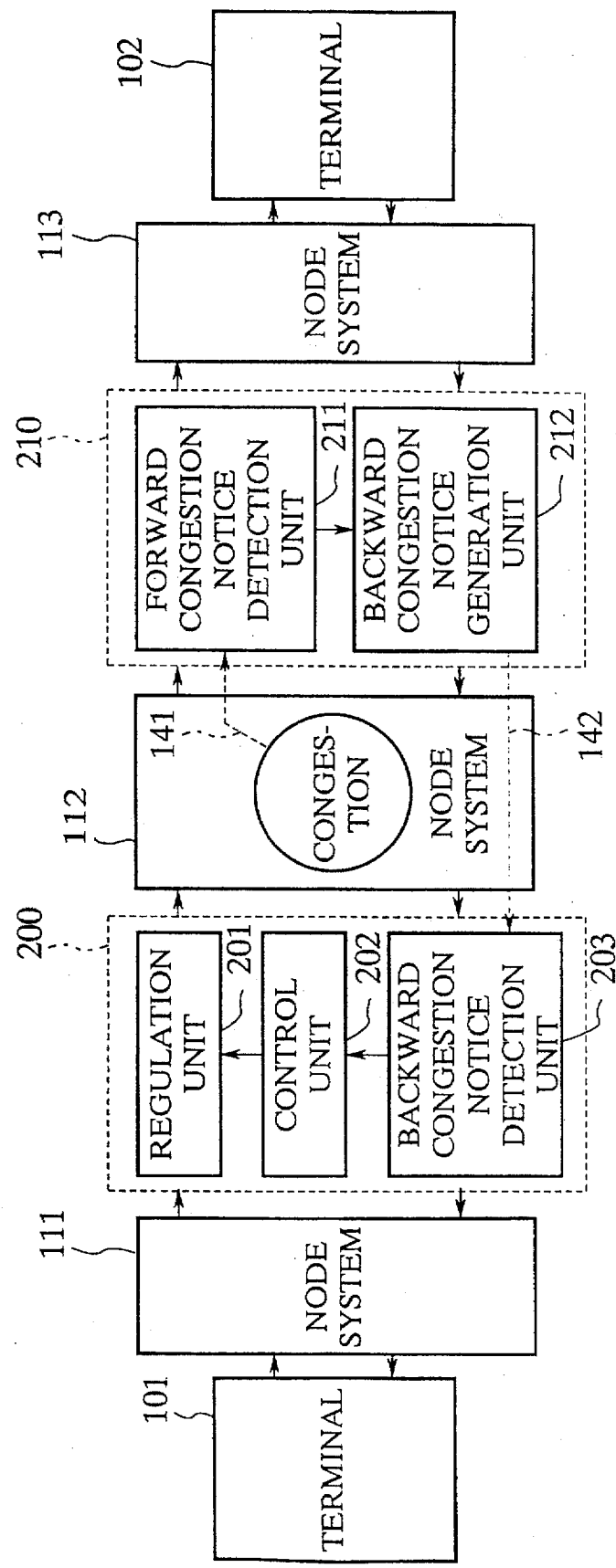
FIG. 5 is a schematic block diagram of a modified configuration for the first embodiment of a communication system according to the present invention.

It is also possible to use a configuration as shown in FIG. 5 for the communication system, which comprises terminals 101 and 102, node systems 111 to 113 connected between the terminals 101 and 102, in which the node system 112 is assumed to have fallen into the congestion state, and cell traffic regulation unit 200 and 210 provided between the node systems 111 and 112 and the node systems 112 and 113, respectively. Here, each of the cell traffic regulation unit 200 and 210 includes the regulation unit 201, the control unit 202, and the backward congestion notice detection unit 203 similar to those in a case of FIG. 1, as well as the forward congestion notice detection unit 211 and the backward congestion notice generation unit 212, even though the cell traffic regulation unit 200 is depicted to include only the regulation unit 201, the control unit 202, and the backward congestion notice detection unit 203 while the cell traffic regulation unit 210 is depicted to include only the forward congestion notice detection unit 211 and the backward congestion notice generation unit 212, for the sake of simplicity.

At the node system 112 which has fallen into the congestion state, the EFCI is set up in the header of the cell transferred from the node system 111, and the occurrence of the congestion state is notified to the receiver terminal 102 as indicated by dashed line 141. In this case, the EFCI is used for the purpose of the congestion notification with respect to the receiver terminal as described in the CCITT I.371 and not used for the purpose of the congestion notification with respect to the sender terminal.

Then, the cell with the EFCI set up is transferred toward the receiver terminal 102 through the cell traffic regulation unit 210, and at this point, the forward congestion notice detection unit 211 of the cell traffic regulation unit 210 monitors the presence or absence of the EFCI set up in the cell, and whenever it is judged that the node system 112 has fallen into the congestion state according to the EFCI, the forward congestion notice detection unit 211 commands the backward congestion notice generation unit 212 in the cell traffic regulation unit 210 to generate the backward congestion notice, and in response, the backward congestion notice generation unit 212 transmits the generated backward congestion notice to the sender terminal 101.

Here, the backward congestion notice can be realized by setting the backward congestion notice identifier in the cell transferred from the node system 113 to the sender terminal 101, or by generating a control cell for the purpose of the congestion notification at the backward congestion notice generation unit 212 and transmitting this control cell to the sender terminal 101. As for the manner of transmitting these congestion notices, it may be such that the backward congestion notice is transmitted to the sender terminal 101 whenever the forward congestion notice is detected by the forward congestion notice detection unit 211, or a new backward congestion notice is not generated for a prescribed period of time once the backward congestion notice is transmitted and generated after an elapse of this prescribed period of time only when the forward congestion notice detection unit 211 is detecting the forward congestion notice at that time.

The backward congestion notice transmitted from the cell traffic regulation unit 210 then passes through the cell traffic regulation unit 200, and at this point, the backward congestion notice detection unit 203 of the cell traffic regulation unit 200 detects this backward congestion notice such that it is possible to judge whether the node system 112 is in the congestion state or not at the cell traffic regulation unit 200. When it is judged that the node system 112 is in the congestion state, the monitoring parameter changing function provided in the control unit 202 of the cell traffic regulation unit 200 is activated to provide a new monitoring parameter for reducing the number of cells flowing into the network compared with the currently used monitoring parameter, and the monitoring of the cells transferred to the node system 112 is continued by using this new monitoring parameter at the regulation unit 201 of the cell traffic regulation unit 200. Here, it is also possible for the cell traffic regulation unit 200 to have a function for notifying the monitoring parameter changed in conjunction with the occurrence of the congestion State of the node system 112.

It is also possible to provide a system having only the forward congestion notice detection unit 211 and the backward congestion notice generation unit 212 solely for the purpose of transmitting the backward congestion notice to the sender terminal, at any desired position within the network to realize the desired congestion control substantially as described above.

Figure 6:
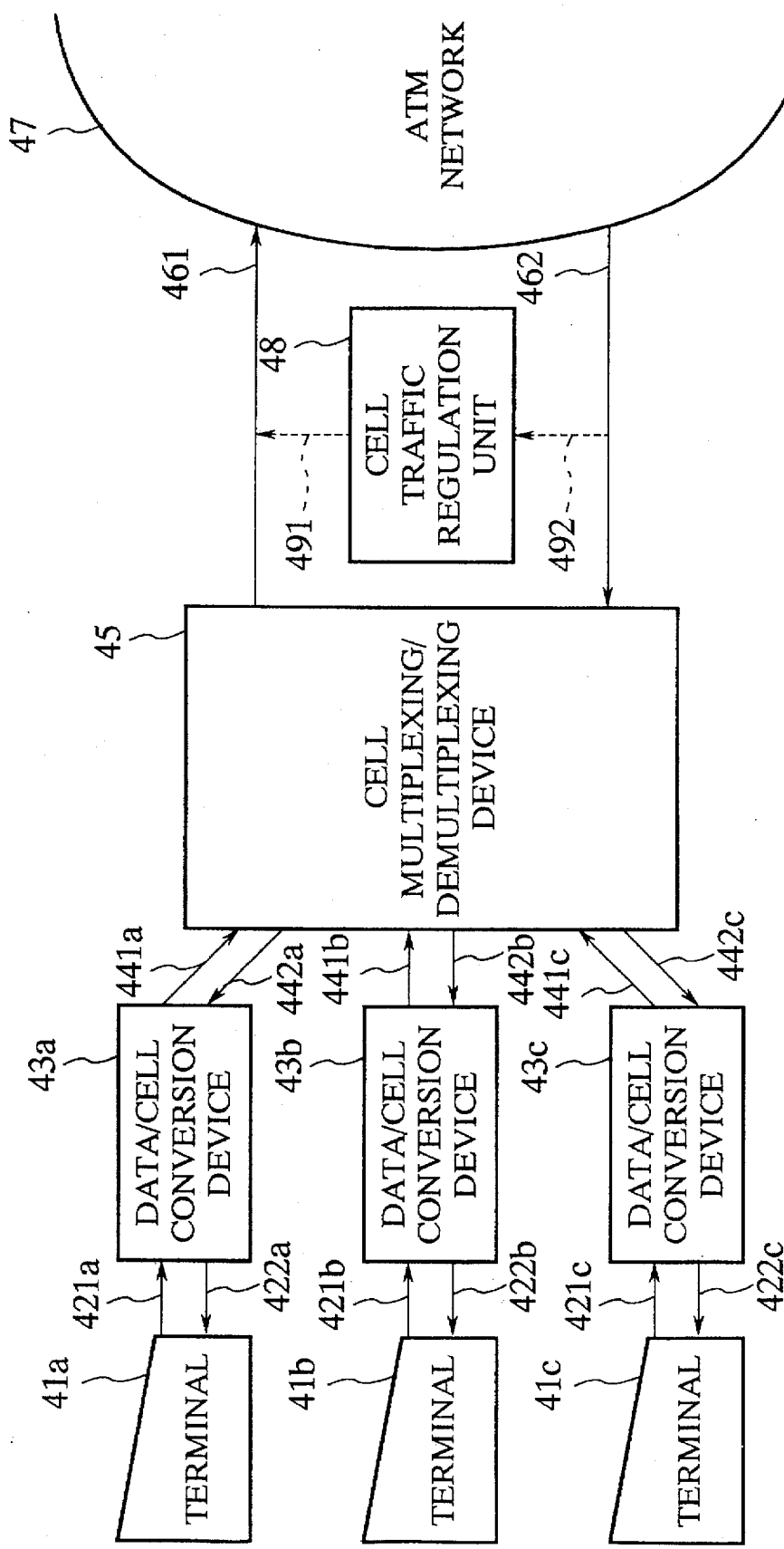
FIG. 6 is a schematic block diagram of the second embodiment of a communication system according to the present invention.

Next, the communication system in the second embodiment of the present invention has a schematic configuration as shown in FIG. 6, which comprises terminals 41a to 41c, data/cell conversion devices 43a to 43c connected with the terminals 41a to 41c for converting the terminal data from the terminals into the cells, and the cells to the terminals into the terminal data, a cell multiplexing/demultiplexing device 45 for multiplexing the cells from the data/cell conversion devices 43a to 43c and transmitting the multiplexed cells to the transmission path 461 while demultiplexing the cells from the transmission path 462 according to the destination among the terminals 41a to 41c, an ATM network connected with the transmission paths 461 and 462, and the cell transfer regulation unit 48 provided on the transmission paths 461 and 462, where the terminals 41a to 41c and the data/cell conversion devices 43a to 43c are connected by the transmission paths 421a to 421c and the 422a to 422c, while the data/cell conversion units 43a to 43c and the cell multiplexing/demultiplexing unit 45 are connected by the transmission paths 441a to 441c and 442a to 442c.

Here, it is possible to incorporate the data/cell conversion devices 43a to 43c within the terminals 41a to 41c if desired, and it is also possible to incorporate the cell traffic regulation unit 48 within each of the terminal 41a to 41c just as in a case of FIG. 4 described above.

In this second embodiment, the cell traffic regulation unit 48 is provided at the physical interface point of the ATM network 47 having the terminals 41a to 41c, in order to monitor and regulate the cells flowing into the ATM network 47. In this cell traffic regulation unit 48, the connection to which the cell transmitting through the transmission path 461 belongs is checked, and the whether the cell is transmitted according to the quality of service (monitoring parameter) of the cell traffic reported from the terminal at a time of setting up that connection is monitored on that connection, and in a case the cell is transmitted in violation to the monitoring parameter, the violation cell is regulated by using the regulation signal 491.

Here, similarly as in the first embodiment described above, whether the EFCI is set up in the header of the cell transmitted from the ATM network 47 through the transmission path 462 is checked by using the EFCI notice signal 492, and whether the ATM network 47 has fallen into the congestion state or not is recognized at the cell traffic regulation unit 48 according to this EFCI notice signal 492. When it is judged that the ATM network 47 has fallen into the congestion state, the new monitoring parameter for reducing the number of cells flowing into the network compared with the currently used monitoring parameter is newly provide by the monitoring parameter changing function of the cell traffic regulation unit 48 with respect to each connection within the transmission path 461 which are monitored by this cell traffic regulation unit 48, and the monitoring of each connection is continued by using this new monitoring parameter.

In the conventional case, there has been no element corresponding to the EFCI notice signal 492, so that it has been impossible to recognize the occurrence of the congestion in the network at the ATM layer level for the cell transfer, and the occurrence of the congestion has been recognized only at the upper layer of the ATM layer so that the controlling to lower the transmission speed at the terminal has been made by using the window flow control or the rate control which are defined by the upper layer protocol.

In contrast, according to the communication system of the present invention, the reduction of the number of cells flowing into the ATM network can be realized by the operation at the ATM layer level, without relying on the controlling at the terminal side defined by the upper layer protocol, so that there is no need to provide the special function for reducing the transmission speed at the upper layer, and the recovery from the congestion state in the ATM network can be realized quickly. In addition, it is also possible to avoid the conventionally arising problem of the occurrence of the buffer overflow in conjunction with the lowering of the transmission speed at the terminal by the window flow control or the rate control defined at the upper layer.

Next, the internal configuration of the cell traffic regulation unit used in the communication system of the above described first and second embodiments of FIG. 1 and FIG. 6 will be described in detail.

Figure 7:
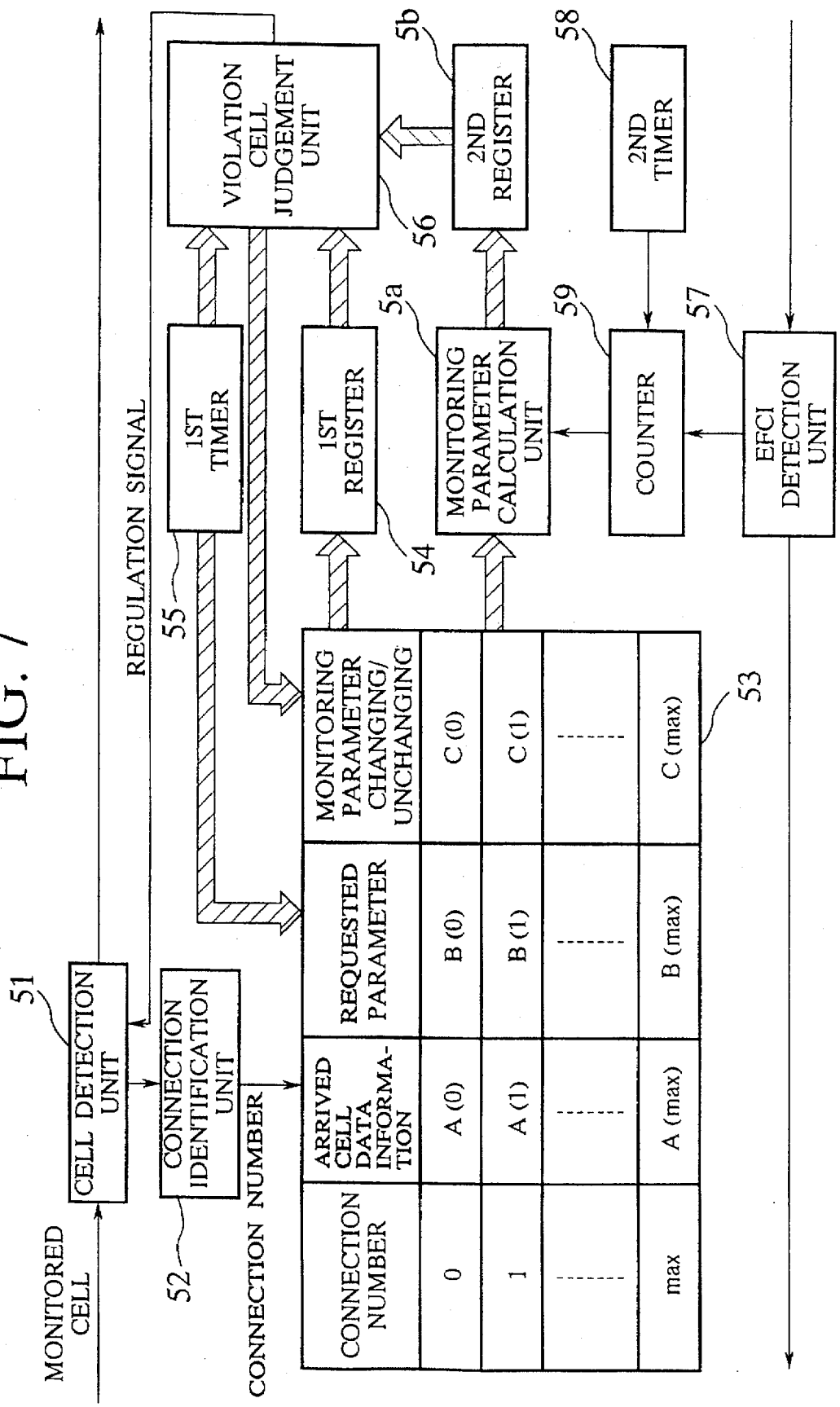
FIG. 7 is a detailed block diagram of an internal configuration of a cell traffic regulation unit used in the communication systems of FIG. 1 and FIG. 6.

Namely, the cell traffic regulation unit in the present invention has an exemplary configuration as shown in FIG. 7, which comprises a cell detection unit 51 for detecting the presence or absence of the arrival of cell belonging to the connection monitored by this cell traffic regulation unit, a connection identification unit 52 for identifying a connection number of a connection to which the cell detected by the cell detection unit 51 belongs, a memory 53 for storing various information corresponding to the connection number obtained by the connection identification unit 52, a first register 54 for reading out the arrived cell information belonging to the same connection as the cell detected by the cell detection unit 51 from the memory 58, and a first timer 55 for measuring a time within the cell traffic regulation unit.

In addition, this cell traffic regulation unit of FIG. 7 further comprises an EFCI detection unit 57 for checking whether the EFCI is set up within the cell arriving from the destination (node system, ATM network, etc.) of the cell detected by the cell detection unit 51 and generating an EFCI notice signal when the EFCI is found, a second timer 58 for generating a signal whenever a prescribed period of time has elapsed, a counter 59 for counting the number of the EFCI notice signals generated by the EFCI detection unit 57 within a prescribed period of time measured by the second timer 58, a monitoring parameter calculation unit 5a for calculating the monitoring parameter to be used in the cell traffic regulation unit with respect to the connection to which the cell detected by the cell detection unit 51 belongs, a second register 5b for registering the monitoring parameter obtained by the monitoring parameter calculation unit 5a, and a violation cell judgement unit 56 for judging the violation cell among the arrived cells according to the values of the first register 54, the first timer 55, and the second register 5b and notifying the violation to the cell detection unit 51 whenever the violation cell is found.

With this configuration, the cell traffic regulation unit operates as follows. When the cell to be monitored arrives, the connection number of the connection to which the arrived cell belongs is checked by the cell detection unit 51 and notified to the connection identification unit 52. The connection identification unit 52 then notifies to the memory 53 the position of the information corresponding to the connection number in the memory 53 in order to read out the information corresponding to the connection number notified from the cell detection unit 51. In the memory 53, at least the arrived cell information, the requested parameter information, and the monitoring parameter changing/unchanging information for each connection number are stored. Here, the monitoring parameter changing/unchanging information indicates whether or not to change the monitoring parameter in response to the congestion detection, and can be set up by the network itself according to the rules agreed with the user at a time of setting up the connection or the attributes of each connection such as the requested QOS level and the priority level.

When the position in the memory 53 is specified by the connection identification unit 52, the arrived cell information is transferred to the first register 54 while the requested parameter and the monitoring parameter changing/unchanging information is transferred to the monitoring parameter calculation unit 5a. Then, when the information corresponding to the connection to which the arrived cell belongs are read out, at the violation cell judgement unit 56, the violation judgement for the arrived cell is made according to the values of the first timer 55 indicating the current time, the first register 54, and the second register 5b to which the monitoring parameter calculated by the monitoring parameter calculation unit 5a are transferred. Unless the arrived cell is judged as the violation cell by the violation cell judgement unit 56, the cell is transmitted through the connection, and at that point, according to the current value of the first timer 55, the arrived cell information corresponding to the connection number of the connection to which the arrived cell belongs is updated within the memory 58. Also, when it is judged as the violation cell, the violation notice signal is generated and transmitted to the cell detection unit 51. At the cell detection unit 51 which received this violation notice signal, the arrived cell is discarded, or the information notifying the violation is attached within the cell (i.e., the tagging is made), or the buffering is carried out for the arrived cell to provide the delay for it until the monitoring parameter is satisfied and the arrived cell is subsequently transmitted.

As shown, by checking the connection number of the connection to which the arrived cell belongs at the cell detection unit 51, reading out the information such as the monitoring parameter information corresponding to the connection number from the memory 53, and by making the violation judgement as specified by the CCITT I.371 for example, it becomes possible to provide the monitoring for a plurality of connections simultaneously while providing only one cell traffic regulation unit, so that the hardware size can be reduced.

Figure 8A:
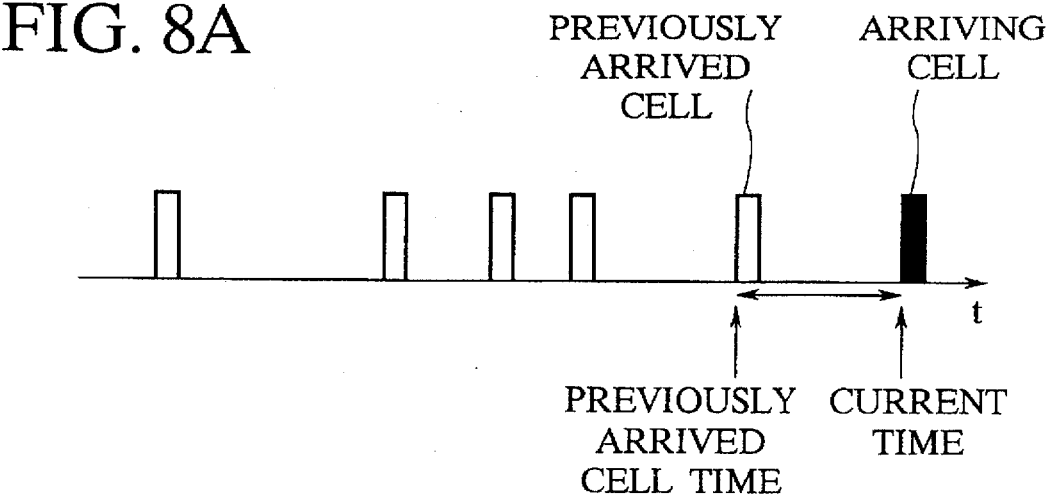
FIGS. 8A, 8B, and 8C are timing charts for quantities used in three different schemes for a violation judgement in the cell traffic regulation unit of FIG. 7.

Here, an example of the requested (monitoring) parameter and the operation of the cell traffic regulation using that used by be described. In a case the peak cell rate recommended by the CCITT is used as a parameter, as shown in FIG. 8A, it suffices to make the violation judgement when a new cell arrives by calculating a time elapsed since the cell belonging to the same connection as that new cell has previously arrived. In this case, the time at which the previously arrived cell had arrived is stored as the arrived cell information in the memory 53 while the minimum value of the cell arrival interval which can be obtained as an inverse of the aforementioned peak cell rate is stored as the requested parameter in the memory 53, for each connection. Then, at the violation cell judgement unit 56, the value (cell arrival interval) obtained by subtracting the previous cell arrival time read out to the first register 54 from the time (present cell arrival time) indicated by the first timer 55 is compared with the minimum value of the cell arrival interval read out to the second register 5b. Then, when the cell arrival interval calculated from the first register 54 and the first timer 55 is less than the minimum value for the cell arrival interval indicated by the second register 5b, the presently arrived cell is judged as a violation cell, whereas when it is greater than or equal to the minimum value for the cell arrival interval, the presently arrived cell is not judged as a violation cell, and the cell arrival time (value of the first timer 55) for the presently arrived cell is newly stored as a new arrived cell information in the memory 53.

Here, in a case of realizing the peak cell rate monitoring accounting for the cell delay variation (CDV), such a monitoring can be achieved in the configuration of this cell traffic regulation unit by providing the tolerable value of the CDV within the violation cell judgement unit 56, and carrying out the Virtual Scheduling Algorithm or the Continuous-State Leaky Bucket Algorithm described in the CCITT I.371 Annex 1 for example.

Figure 8B:
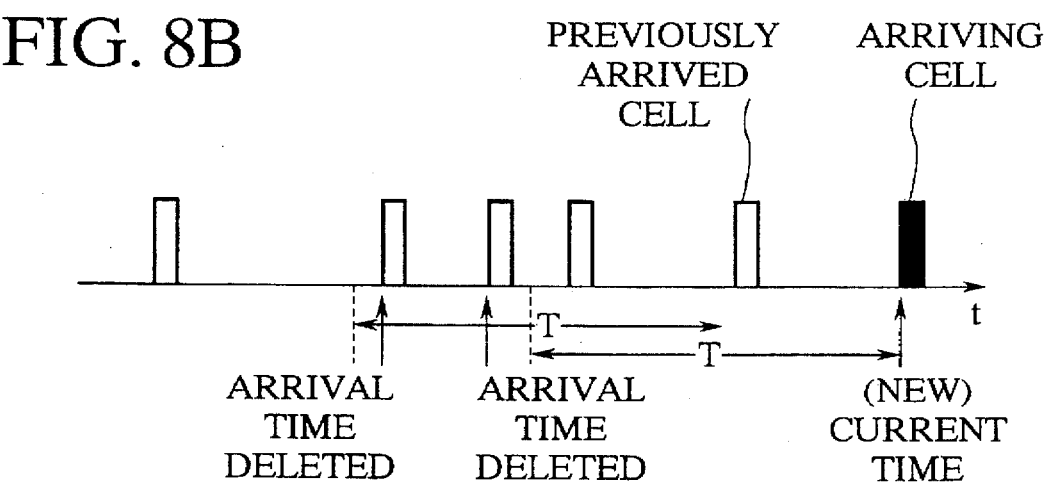
Figure 8C:
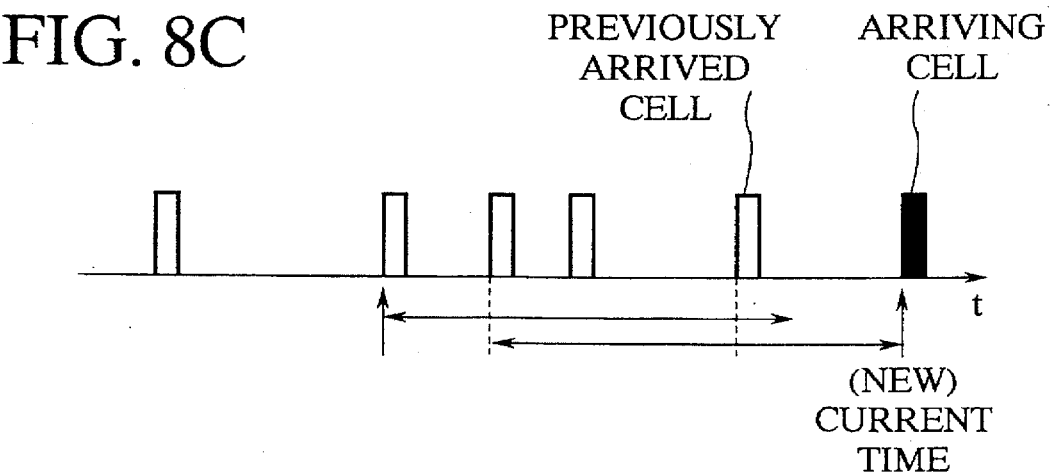

It is also possible to utilize a scheme which uses the maximum value X of the number of cells transmitted within a prescribed period of time T as a parameter. By this, it becomes possible to specify the average rate of the cells transmitted within a relatively long period of time. In this case, it is possible to use either one of the following two schemes including:

(i) a scheme in which the number of cells arrived during the period of time T in the past including the time at which the presently arrived cell has arrived as shown in FIG. 8B is calculated and compared with the maximum value X, and (ii) a scheme in which the time elapsed since the arrival of the X times previous cell had arrived until the presently arrived has arrived as shown in FIG. 8C (for a case of X=3) is calculated and compared with the period of time T[ra In the former scheme (i), the arrival time of each cell which had arrived during the period of time T in the past since the previously arrived cell is stored as the arrived cell information in the memory 53 while the maximum value X of the number of cells and the period of time T are stored as the requested parameters in the memory 53, for each connection. Then, at the violation cell judgement unit 56, the number of cells which has arrived during the period of time T in the past since the current time is calculated according to the arrival time of each cell which had arrived during the period of time T in the past since the previously arrived cell which is read out to the first register 54 and the arrival time of the presently arrived cell (value of the first timer 55).

More specifically, according to the arrival time of each cell which had arrived during the period of time T in the past since the previously arrived cell which is read out to the first register 54, the information of all the cells arrived before the time t−T where t is the current time are deleted, and 1 is added to the number of remaining cells to account for the presently arrived cell. Then, this value is compared with the maximum value X of the number cells transmitted within the period of time T which is read out to the second register 5b, and when this value is greater than that maximum value X, the presently arrived cell is judged as a violation cell, whereas when this value is not greater than the maximum value X, the presently arrived cell is not judged as a violation cell and the arrival time of each cell arrived during the period of time T in the past including the cell information of the present arrival time as updated by the violation cell judgement unit 56 is newly stored as a new arrived cell information in the memory 53.

On the other hand, in the latter scheme (ii), the cell arrival times of the total X+1 cells from the cell arrived X times before the previously arrived cell up to the previously arrived cell are stored as the arrived cell information in the memory 53 while the maximum value X of the number of cells and the period of time T are stored as the requested parameters in the memory 53, for each connection. Then, at the violation judgement unit according to the arrival times of the total X+1 cells from the cell arrived X times before the previously arrived cell up to the previously arrived cell which are read out to the first register 54 and the arrival time (value of the first timer 55) of the presently arrived cell, the time interval between the arrival time of the presently arrived cell and the arrival time of the cells X times before the presently arrive cell is calculated. Then, this value is compared with the period of time T read out to the second register 5b, and when this value is less than the period of time T, the presently arrived cell is judged as a violation cell, whereas when this value is not less than the period of time T, the presently arrived cell is not judged as a violation cell, and the arrival times of the total X+1 cells in the past in which the arrival time of the oldest arrived cell (the cell arrived X+1 times before the presently arrived cell) is deleted and the arrival time of the presently arrived cell is newly added is newly stored as a new arrived cell information in the memory 53.

In parallel to the operation concerning the violation judgement of the arrived cell as described above, the cell traffic regulation unit also carries out the following operation for recognizing the presence or absence of the congestion state in the cell destination. Namely, in FIG. 7, when one cell transmitted from the cell destination is received at the EFCI detection unit 57, the EFCI detection unit 57 checks whether the EFCI is set up within that one cell, and the EFCI detection signal is supplied to the counter 59 when the EFCI is set up. Here, there may be a plurality of connections to which that one cell transmitted from the cell destination, so that the EFCI detection unit 57 is provided with the connection number of the connection to which the cell to be transmitted to the cell destination in advance, and the EFCI detection signal is supplied to the counter 59 only when that one cell transmitted from the cell destination belongs to the connection with the same connection number as that provided in advance. At the counter 59, the counter value is updated whenever the EFCI detection signal is sent by the EFCI detection unit 57, and when the signal from the second timer 58 is received, the counter value at that time is notified to the monitoring parameter calculation unit 5a.

Figure 9A:
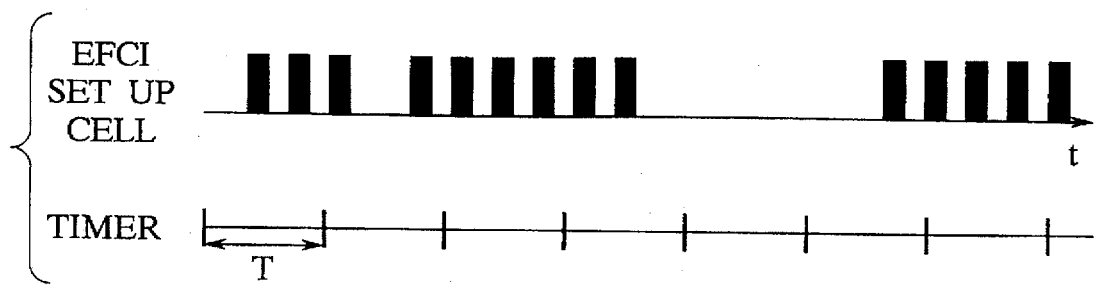
FIGS. 9A, 9B, and 9C are timing charts for explaining operation of a second timer in the cell traffic regulation unit of FIG. 7.
Figure 9B:
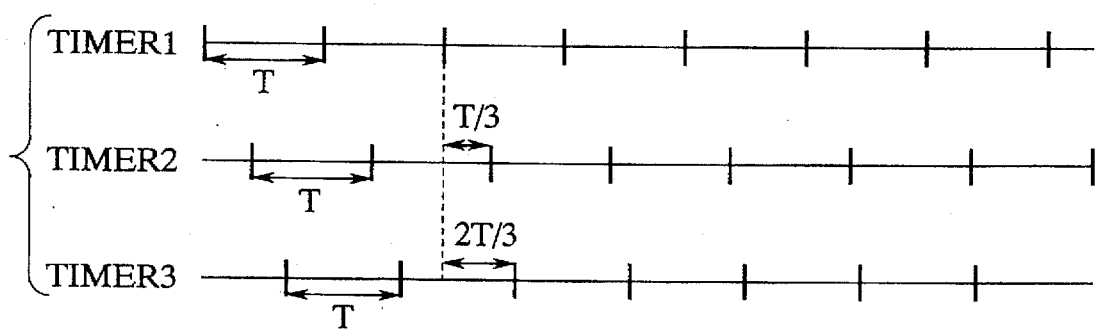
Figure 9C:
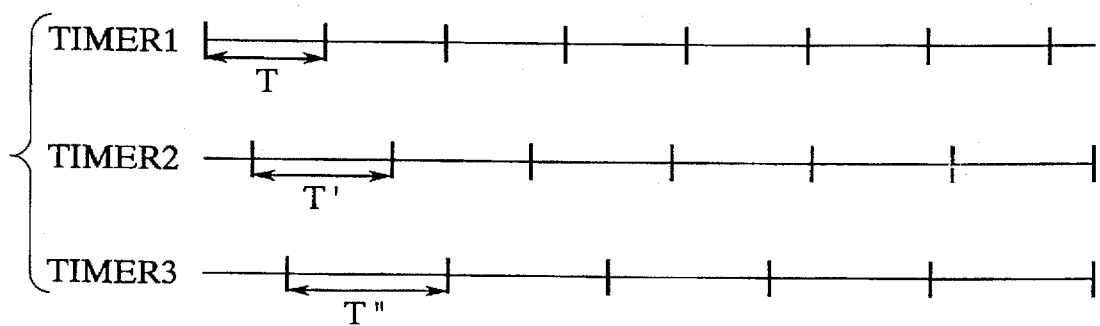

Next, an exemplary operation of the second timer 58 in the configuration of FIG. 5 will be described. Namely, as shown in FIG. 9A, the second timer 58 can be equipped with a timer for generating a signal when the period of time T is measured, such that the counter 59 counts the number of EFCI set up cells received within the period of time T according to this signal generated by the second timer. Also, as shown in FIG. 9B, the second timer 88 can be equipped with n sets of timers (timer 1, timer 2, and timer 3 for a case of n=3 in FIG. 9B), each of which generates a signal when the period of time T is measured, where the timer x ($1 \leq x \leq n$) is set to generate the signal after a delay of $(x-1)T/n$ since the generation of the signal by the timer 1, such that the counter 59 counts the number of EFCI set up cells received within the period of time T measured by any timer x according to the signal generated by this timer x. Also, as shown in FIG. 9C, the second timer 58 can be equipped with a plurality of timers (timer 1, timer and timer 3 for a case of three in FIG. 9C), each of which generates a signal when its own unique period of time is measured independently, such that the counter 59 counts the number of EFCI set up cells received within the period of time T measured by arbitrary timer according to the signal generated by this arbitrary timer. It should be apparent that the scheme of FIG. 9B is a special case of the scheme of FIG. 9C. In the following, the configuration and the operation of the second timer 58 and the counter 59 in the configuration of FIG. 7 will be described in detail.

First, in a case the second timer 58 operates according to the scheme of FIG. 9A, the counter value in the counter 59 is increased by one whenever the EFCI detection signal is sent, and when the counter 59 receives the signal generated by the second timer 58 measuring the period of time T, the counter value at that point is notified to the monitoring parameter calculation unit 5a while at the same time the counter value is reset to 0, as shown in FIG. 7.

Figure 10A:
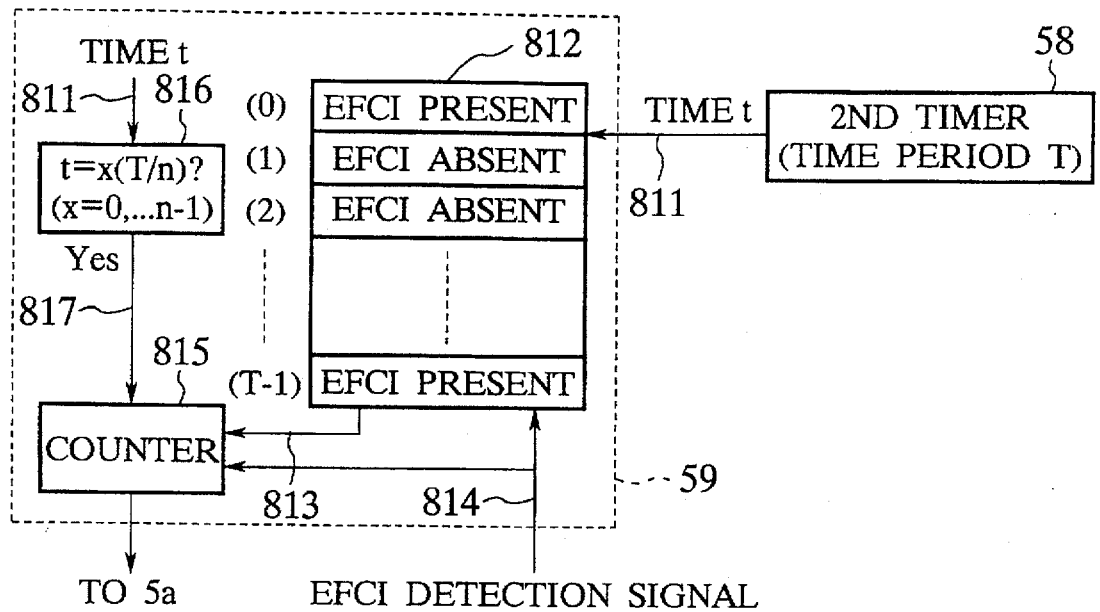
FIGS. 10A and 10B are block diagrams of two possible configurations for a counter in the cell traffic regulation unit of FIG. 7.

Next, in a case the second timer 58 operates according to the scheme of FIG. 9B, the counter 59 has an exemplary configuration as shown in FIG. 10A. In this FIG. 10A, the second timer 58 notifies the measured time t ($0 \leq t < T$) the counter 59. This counter of FIG. 10A has a counter 815 for measuring the number of EFCI set up cells and an EFCI setting information memory 812 which stores the presence or absence of the EFCI setting with respect to the cells arrived during the period of time T in the past, where the address indicating the position of the information in this memory 812 corresponds to the time t measured by the second timer 58. In this counter 59, when the time t is received from the second timer 58 through a signal 811, the information stored in the EFCI setting information memory 812 at the address corresponding to this time t is read out to a signal 818, to notify the information content to the counter 815. Here, when the EFCI setting information notified through the signal 813 is "EFCI present", the counter value of the counter 815 is reduced by one, and then the information ("EFCI present" or "EFCI absent") of the EFCI detection signal 814 is notified to the EFCI setting information memory 812 and the counter 815. At the EFCI setting information memory 812, the EFCI detection signal information is overwritten at the address corresponding to the time t, while at the counter 815, the counter value is increased by one when the content of the EFCI detection signal information is "EFCI present". By this operation, the counter value in the counter 815 indicates the number of EFCI set up cells arrived during the period of time T in the past including the current time.

In addition, the counter 59 is also equipped with a device 816 for generating a signal 817 with respect to the counter 815 when the time t notified from the second timer 58 is equal to $x \times (T/n)$, where n is a number of counters in second timer 58 according to the scheme of FIG. 9B, and x is an integer satisfying $0 \leq x < n$. By means of this device 816, the operation of the n sets of the timers with the periods displaced by T/n from each other which generate the reset signal whenever the period of time T has elapsed as shown in FIG. 9B can be realized by using a single timer. Then, the counter 815 notifies the current counter value to the monitoring parameter calculation unit 5a only when the signal 817 is received from the device 816. It is to be noted that, by setting n=1, the configuration of FIG. 10A can operate according to the scheme of FIG. 9A as well.

Figure 10B:
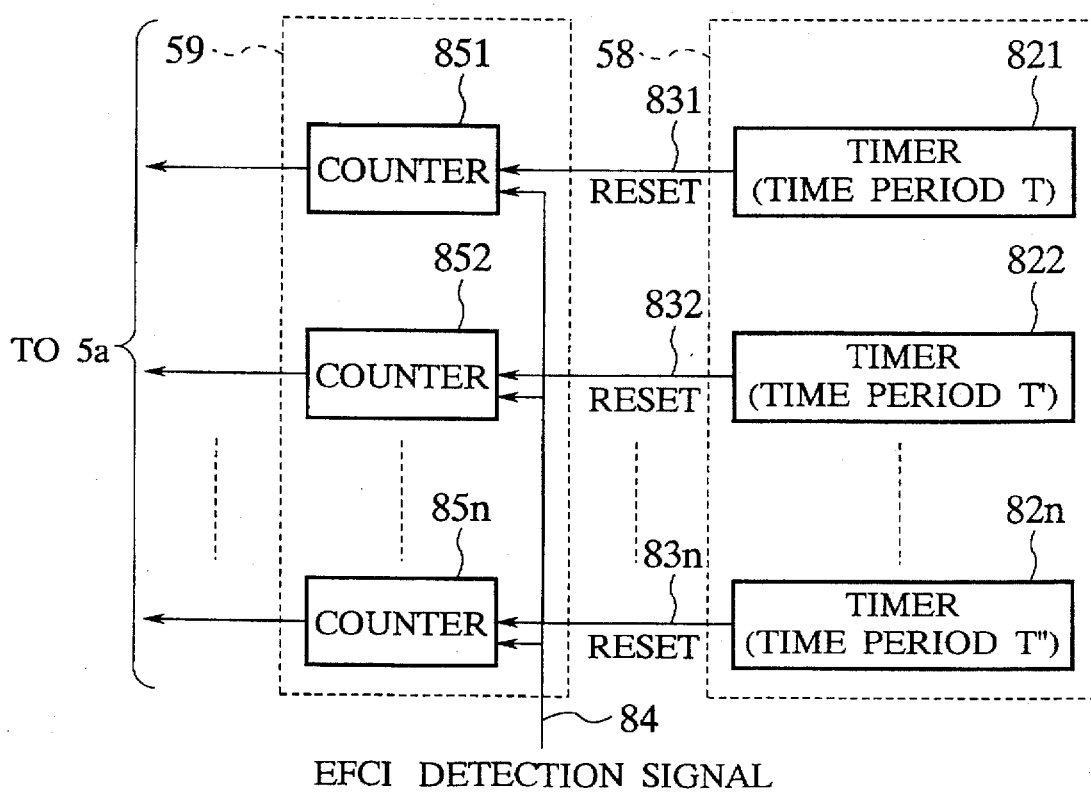

Next, in a case the second timer 58 operates according to the scheme of FIG. 9C, the counter 59 has an exemplary configuration as shown in FIG. 10B. In this FIG. 10B, the second timer 58 is provided with a plurality of timers 821, 822, ..., 82n, which generate the reset signals 831, 832, ..., 83n, respectively, at unique time periods of the respective timers. The counter 59 is provided with a plurality of counters 851, 852, ..., 85n in correspondence to the timers 821, 822, ..., 82n of the second timer 58, in each of which the counter value is increased by one whenever the EFCI detection signal 84 is supplied. Then, the counter which received the reset signal from the corresponding timer notifies the current counter value to the monitoring parameter calculation unit 5a while its counter value is reset to 0. It is to be noted that this configuration of FIG. 10B can be made to operate according to the scheme of FIG. 9B as well.

In a case of using the configuration as shown in FIG. 4 in which the cell traffic regulation unit is to be incorporated within the node system, it is possible to remove the EFCI detection unit 57 in the configuration of FIG. 7 from the cell traffic regulation unit and supply the congestion notice signal 1126 generated from the buffer monitoring unit 1123 directly to the counter 59. In this case, it is also possible to remove the EFCI detection unit 57, the second timer 58, and the counter 59 from the cell traffic regulation unit and supply the congestion notice signal 1126 generated from the buffer monitoring unit 1123 directly to the monitoring parameter calculation unit 5a.

Next, some exemplary configurations for the monitoring parameter calculation unit 5a in the configuration of FIG. 7 will be described.

Figure 11:
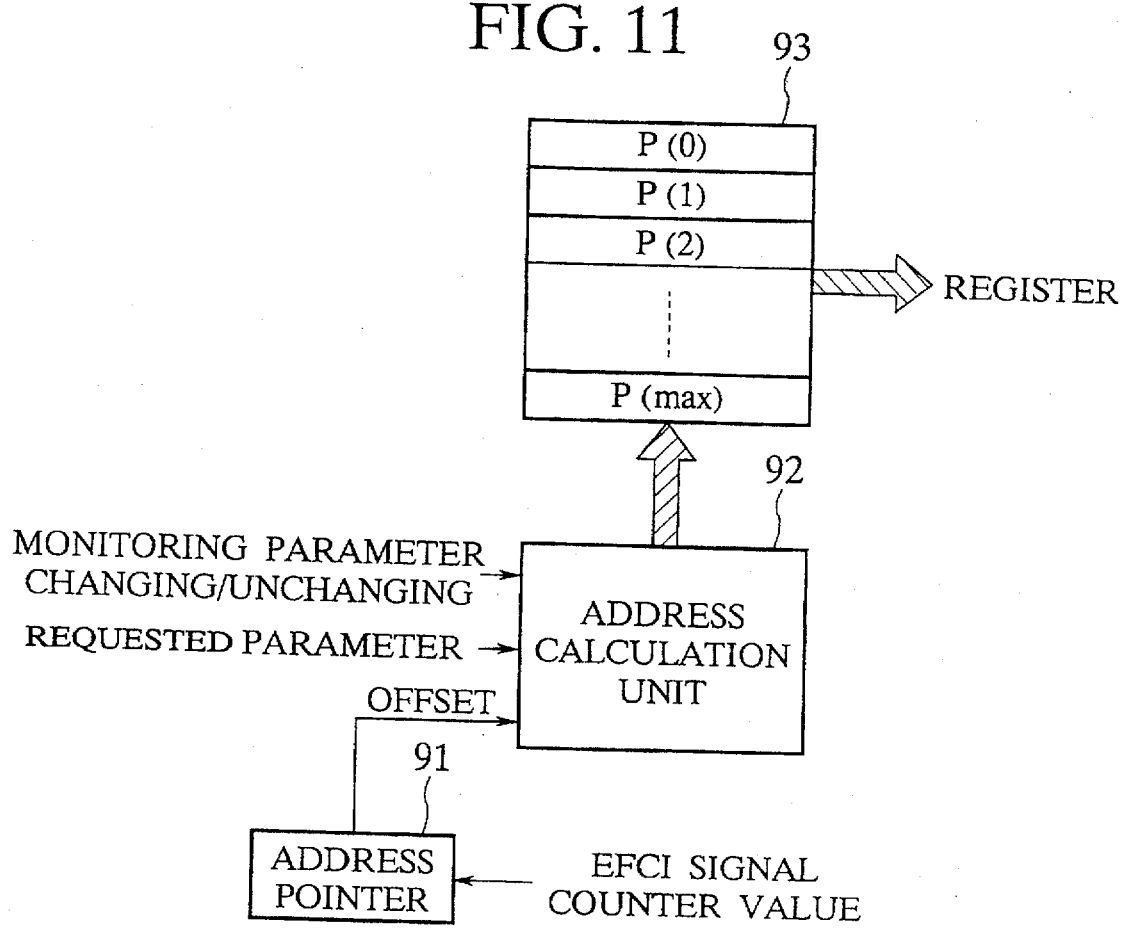
FIG. 11 is a block diagram of a configuration for a monitoring parameter calculation unit in the cell traffic regulation unit of FIG. 7.

First, a scheme in which a memory for storing the candidates of the monitoring parameter by which the monitoring of the cell traffic regulation unit can be made is provided in the monitoring parameter calculation unit 5a such that the change of the monitoring parameter according to the presence or absence of the congestion in the network of the cell destination is realized will be described. In this case, the monitoring parameter calculation unit 5a has a configuration as shown in FIG. 11, which comprises an address pointer 91 for changing its value according to the content of the counter value counting the EFCI signals in the cell traffic regulation unit, an address calculation unit 92 for calculating an address at which the monitoring parameter to be used for the monitoring is stored according to the content of the address pointer 91 and the memory 53 in the cell traffic regulation unit of FIG. 7, and a memory 93 for storing the candidates of the monitoring parameter by which the monitoring of the cell traffic regulation unit can be made. Here, the value of the requested parameter stored in the memory 53 in the cell traffic regulation unit of FIG. 7 is going to be given by the address in the memory 93 at which the requested parameter is stored.

Figure 12:
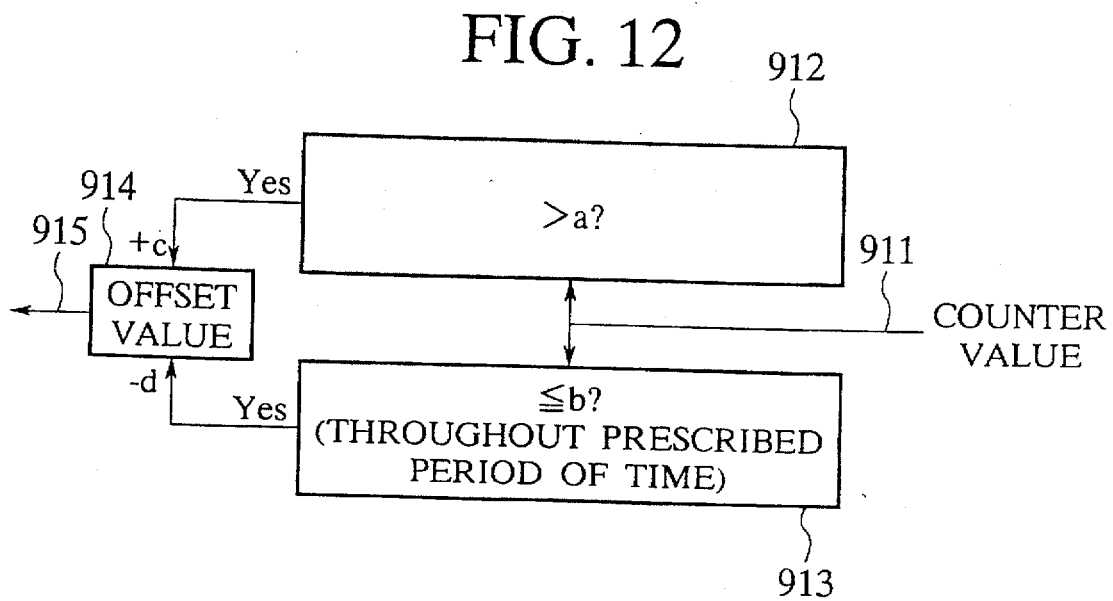
FIG. 12 is a block diagram of one possible configuration for an address pointer in the monitoring parameter calculation unit of FIG. 11.

The address pointer 91 in the configuration of FIG. 11 has an exemplary configuration as shown in FIG. 12, in which the counter value 911 notified by the counter 59 in FIG. 7 is compared with a value "a" at an element 912, and with a value "b" at an element 913 whenever the counter value 911 is received. When the counter value 911 is greater than the value "a", it is judged that the cell destination has fallen into the congestion state, and when the counter value is less than or equal to the value "b", it is judged that the cell destination has not fallen into the congestion state. Here, it is preferable to have a relationship of "a"≦"b". In a case the counter value 911 is less than or equal to the value "a" and greater than the value "b", it is not judged as either one of the above described states.

Then, when the counter value 911 is greater than the value "a" at the element 912, a value "c" is added to the offset value 914 as the monitoring parameter for reducing the cells flowing into the network compared with the present is going to be used, whereas when the counter value 911 is less than or equal to the value "b" at the element 913, a value "d" is subtracted from the offset value 914 as the monitoring parameter for increasing the cells flowing into the network compared with the present is going to be used, and the resulting offset value 915 is notified to the address calculation unit 92. Here, the offset value 914 is restricted to be a value greater than or equal to 0.

In FIG. 12, the values "c" and "d" to be added or subtracted are assumed to be constants, but it is also possible to change these values "c" and "d" to be added or subtracted depending on the counter value 911. It is also possible to modify the scheme of FIG. 12 such that, when it is judged that the recovery from the congestion state has been made as the counter value 911 becomes less than or equal to the value "b" so that the monitoring parameter for increasing the cells flowing into the network compared with the present is going to be used, the counter value 911 is observed for a prescribed period of time since the counter value 911 become less than or equal to the value "b", and the value "d" is subtracted from the offset value 914 only when it is confirmed that the counter value 911 remains to be less than or equal to the value "b" during this observation.

Figure 13:
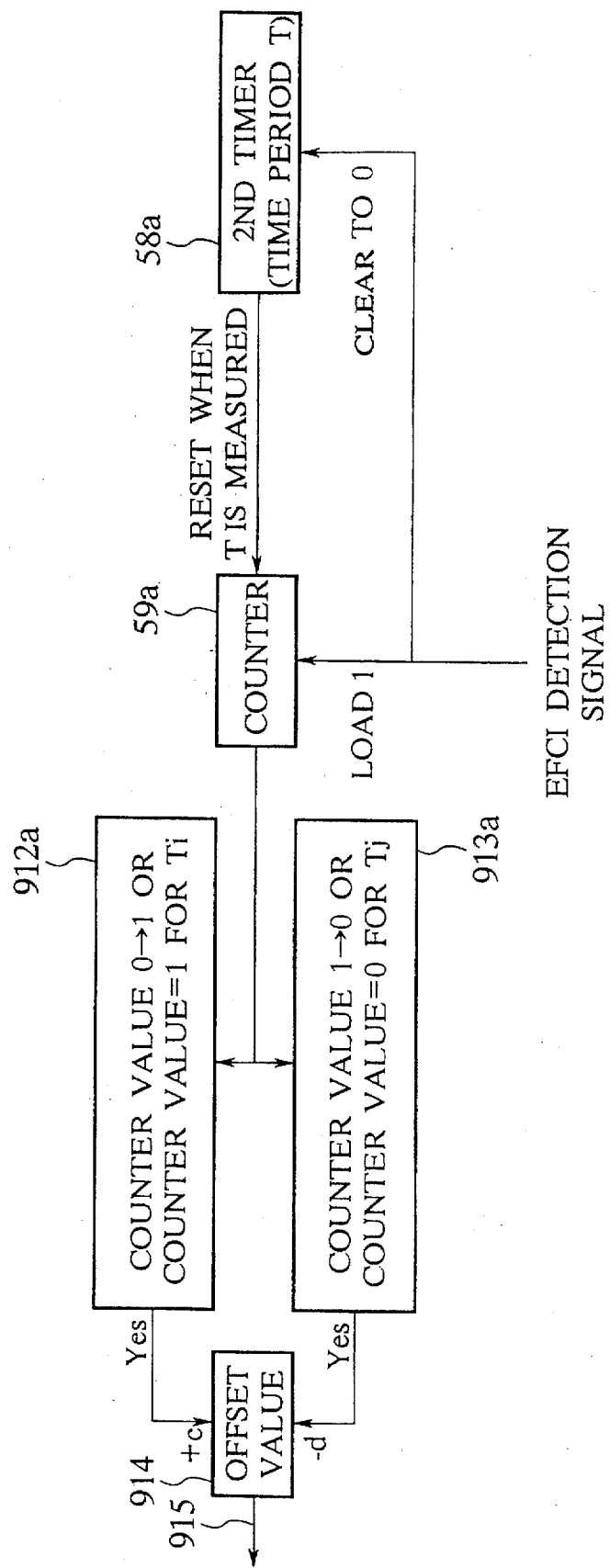
FIG. 13 is a block diagram of another possible configuration for an address pointer in the monitoring parameter calculation unit of FIG. 11.

In a case the values "a" and "b" in FIG. 12 are such that "a"="b"=0 (that is, a case in which the occurrence of the congestion is judged whenever even one EFCI set up cell has arrived during the period of time T), the second timer 58 and the counter 59 of FIG. 7 and the address pointer 91 of FIG. 11 can be realized in a configuration shown in FIG. 13. In this configuration of FIG. 13, whenever the EFCI detection signal is received, the second time 58a is cleared to a value 0, and the value 1 is loaded into the counter 59a. The second timer 58a has a function for measuring the period of time T unless it is cleared by the EFCI detection signal, and the second timer 58a resets the counter 59a to a value 0 when it has successfully measured the period of time T without being interrupted by the EFCI detection signal. By means of this, it becomes possible to recognize whether the EFCI set up cell has arrived within the period of time T or not by simply checking the counter value of the counter 59a.

Then, when the counter value of the counter 59a is turned to 1 or remains to be 1 for a certain period of time Ti at the element 912a, the value "c" is added to the offset value 914, whereas when the counter value of the counter 59a is turned to 0 or remains to be 0 for a certain period of time Tj at the element 913a, the value "d" is subtracted from the offset value 914. In this manner, the hardware size of the configuration can be reduced compared with those of the second timer 58 and the counter 59 as shown in FIGS. 10A and 10B described above.

Figures 14, 15:
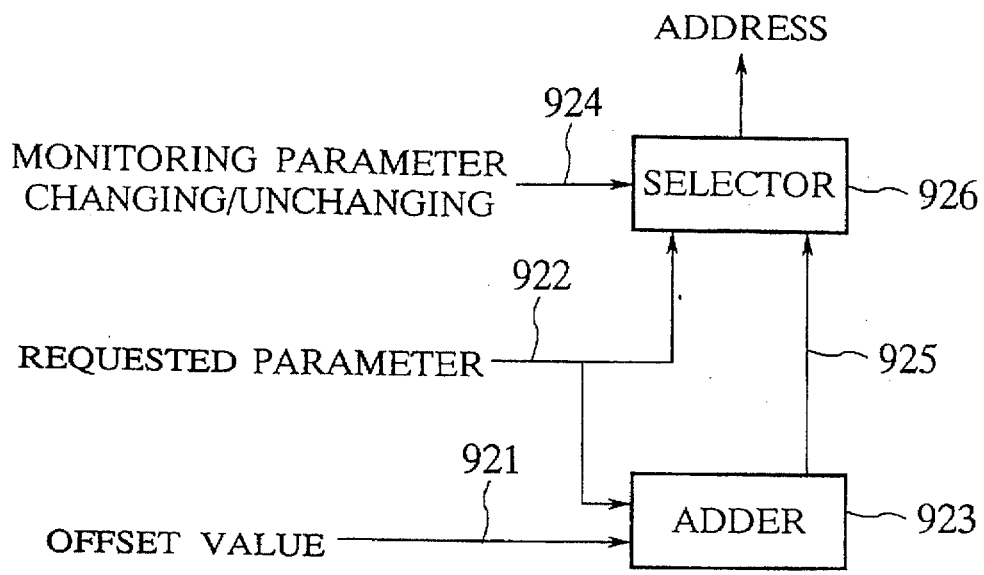
FIG. 14 is a block diagram of one possible configuration for an address calculation unit in the monitoring parameter calculation unit of FIG. 11.
FIG. 15 is a table indicating an exemplary configuration of a memory in the monitoring parameter calculation unit of FIG. 11.

Next, the address calculation unit 92 in the configuration of FIG. 11 has an exemplary configuration as shown in FIG. 14, and the memory 93 in the configuration of FIG. 11 has an exemplary configuration as shown in FIG. 15 in which each entry contains the address and the monitoring parameter.

At the address calculation unit 92, a sum of the offset value 921 obtained by the address pointer 91 and the requested parameter 922 (actually an address in which the requested parameter is stored as a monitoring parameter in the memory 93) obtained from the memory 53 of FIG. 7 is calculated by an adder 923, and the value stored in the memory 93 at the address corresponding to this sum is used as the monitoring parameter at a time of the congestion state. Here, among the connections, there are connections which do not allow the change of the monitoring parameter according to the congestion state, so that the the monitoring parameter changing/unchanging information 924 indicating whether the change of the monitoring parameter at a time of the congestion state is allowed for each connection or not is also sent to the address calculation unit 92 from the memory 53 in FIG. 7. Then, the selector 926 selects the address 925 obtained by the adder 923 in a case the monitoring parameter change is allowed, or the address 922 specified by the requested parameter in a case the monitoring parameter change is not allowed, and outputs the selected address to the memory 93.

At the memory 93, the monitoring parameter corresponding to the address sent by the address calculation unit 92 is written into the second register 5b in FIG. 7. At this point, at the memory 93 which stores the candidates of the monitoring parameter to be provided at the cell traffic regulation unit, the stored monitoring parameter candidates have the relationship of:

$$P(0) > P(1) > \ldots > P(x-1) > P(x) > P(x+1) > \ldots$$

where P(x) is the amount of cells flowing into the network when the monitoring parameter registered at the address x is used for the monitoring.

Here, it should be apparent that, in a case the value "c" is subtracted from the offset value 914 when it is judged that it is in the congestion state and the value "d" is added to the offset value 914 when it is judged that it is not in the congestion state at the address pointer 91 shown in FIG. 12, the stored monitoring parameter candidates in the memory 93 have the relationship of:

$$P(0) < P(1) < \ldots < P(x-1) < P(x) < P(x+1) < \ldots$$

Among the connections for which the monitoring is carried out at the cell traffic regulation unit as described above, the connections for which the monitoring parameter change is allowed are restricted to the connections which require no constant quality of service only, such that the change of the monitoring parameter with respect to the connections which require quality of service can be avoided and the service can be provided as requested from the terminal for the connections which require the quality of service even when the ATM network falls into the congestion state.

Also, by carrying out the monitoring and the regulation using the monitoring parameter at the cell traffic regulation unit when the ATM network falls into the congestion state, with respect to those connections for which the monitoring and the regulation are not carried out at normal time as well, the recovery from the congestion state can be made quickly. In addition, the connections for which the change of the monitoring parameter is not going to be made even when the network has fallen into the congestion state are also provided to the terminals.

Figure 16:
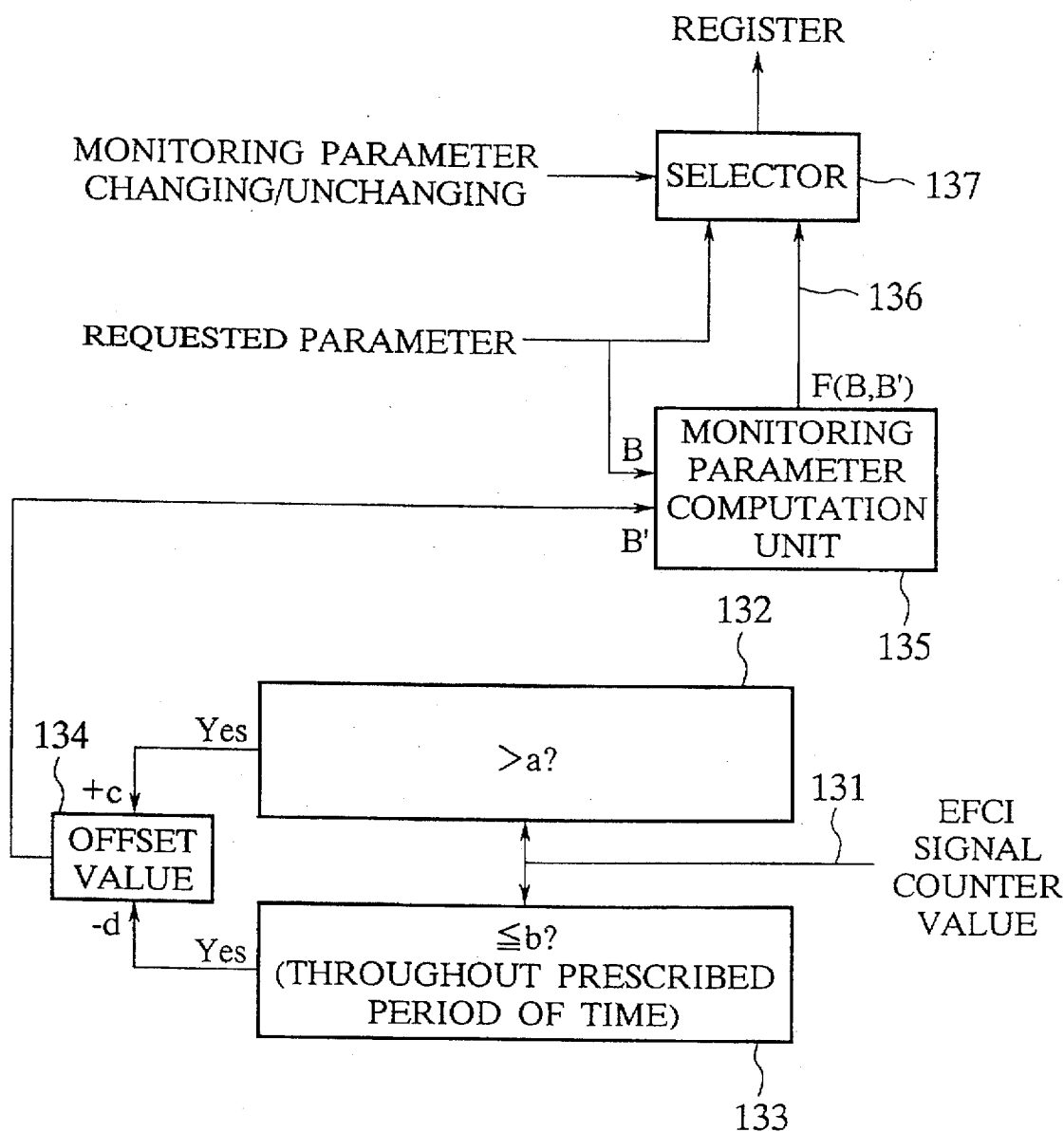
FIG. 16 is a block diagram of another configuration for a monitoring parameter calculation unit in the cell traffic regulation unit of FIG. 7.

Next, as an alternative configuration of the monitoring parameter calculation unit 5a of FIG. 7, a scheme in which the change of the monitoring parameter according to the presence or absence of the congestion in the network of the cell destination is realized by the calculation will be described. In this case, the monitoring parameter calculation unit 5a has a configuration as shown in FIG. 16, in which whether the network of the cell destination has fallen into the congestion state or not is judged by the elements 132 and 133 similar to the elements 912 and 913 in the address pointer 91 of FIG. 12 from the EFCI signal counter value 911, and the resulting offset value 134 is sent to the monitoring parameter computation unit 135.

In this monitoring parameter computation unit 135, a function F(B, B') having the requested parameter B obtained from the memory 53 in FIG. 7 and the offset value B' given by the resulting offset value 134 as its arguments is executed, and the resulting parameter is written into the second register 5b in FIG. 7 as the monitoring parameter to be used at a time of the congestion state. Here, for those connections which do not allow the change of the monitoring parameter according to the congestion state, the selector 137 selectively outputs one of the monitoring parameter obtained by the monitoring parameter computation unit 135 and the requested parameter obtained from the memory 53 in FIG. 7 to the second register 5b according to the monitoring parameter changing/unchanging information from the memory 53 in FIG. 7, just as in the case of the address calculation unit 92 in FIG. 14 described above.

Here, the exemplary forms of the function F(B, B') to be executed at the monitoring parameter computation unit 135 will be described. Namely, in correspondence to the examples of the requested (monitoring) parameter described above in conjunction with FIGS. 8A to 8C, the function F(B, B') can be set up as follows.

(a) Case of monitoring by the peak cell rate

In this case, the minimum value of the cell arrival time interval (i.e., an inverse of the maximum peak cell rate) is used as the requested parameter, so that when this minimum value is set as the argument B along with the offset value B', the function F becomes:

$$F(B, B')=B+\alpha B'$$

or $$F(B, B')=B\times \alpha B'$$

where $\alpha$ is a positive constant.

(b) Case of monitoring by the maximum value X of the number of cells transmitted within the period of time T In this case, the above described set B=(T, X) is used as the requested parameter. Then, with the offset value B', the form of the function F depends on the judgement scheme at the violation cell judgement unit 56 in FIG. 7 as follows.

(b-1) In a case of the scheme in which the number of cells arrived during the period of time T in the past including the arrival time of the presently arrived cell is compared with the maximum value X, the function F becomes:

$$F(B, B')=(T, X-\beta B')$$

or $$F(B, B')=(T, X/(\beta B'))$$

where $\beta$ is a positive constant.

(b-2) In a case of the scheme in which the elapsed time since the arrival of the X times previous cell until the arrival of the presently arrived cell is compared with the period of time T, the function F becomes $$F(B, B')=(T+\gamma B', X)$$

or $$F(B, B')=(T\times \gamma B', X)$$

where $\gamma$ is a positive constant.

It is to be noted that in a case the offset value B'=0, it indicates the monitoring by the requested parameter, so that it is preferable for the function F to satisfy the relationship of F(B, 0)=B in a case of the monitoring by the peak cell rate, or the relationship of F(B, 0)=(T, X) in a case of the monitoring by the maximum value X of the number of cells transmitted within the period of time T.

In the scheme for realizing the change of the monitoring parameter according to the presence or absence of the congestion in the network of the cell destination by the calculation as described above, it is also possible to use the following forms of the function F for the above described cases (a), (b-1), and (b-2):

For (a):

$$F(B, B')=B\times(2\times \alpha')\times B'$$

For (b-1):

$$F(B, B')=(T, X/\{(2\times \beta')\times B'\})$$

For (b-2):

$$F(B, B')=(T\times(2\times \gamma')\times B', X)$$

where $\alpha'$, $\beta'$, $\gamma'$ are integers greater than or equal to 1.

Figure 17:
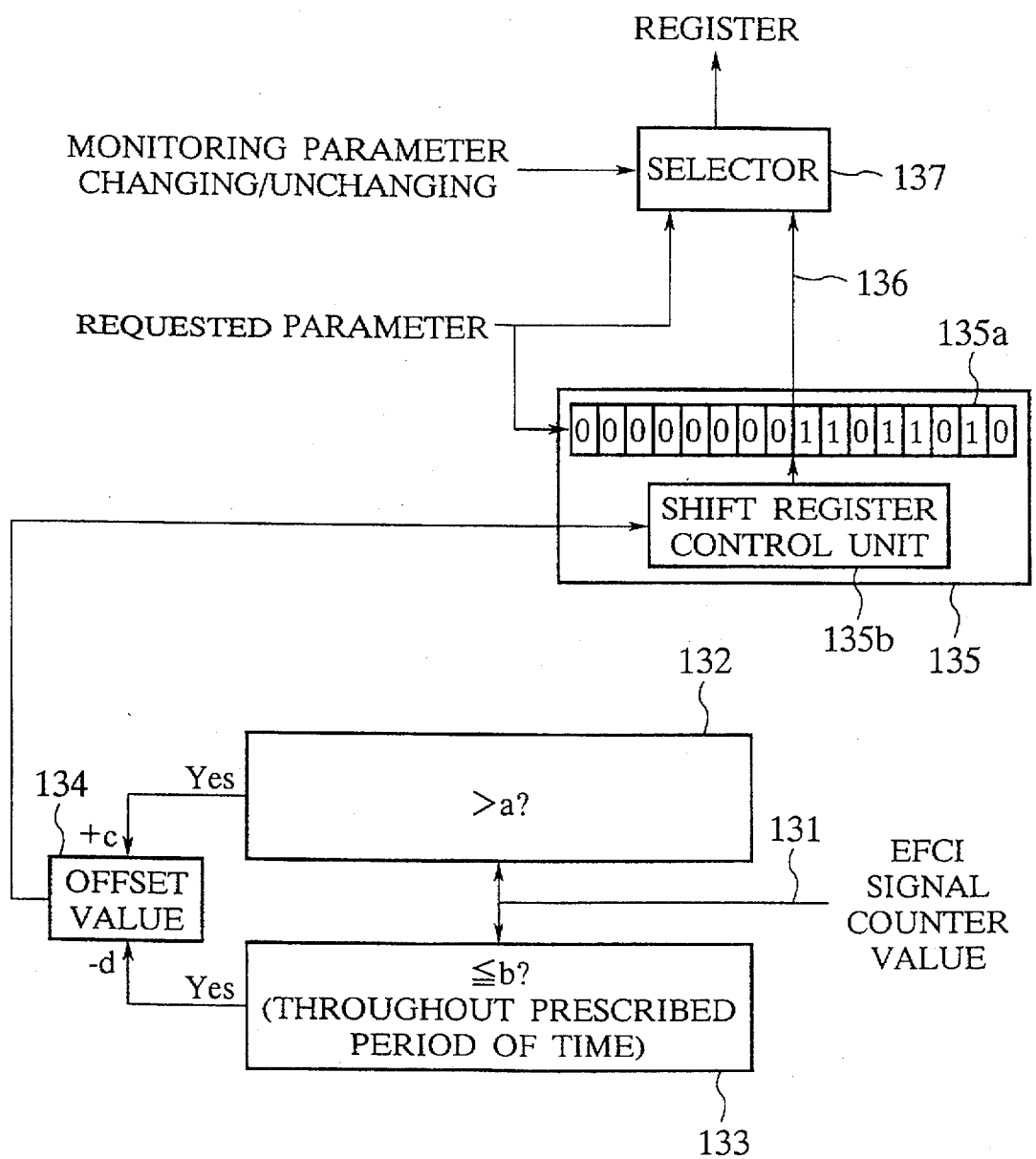
FIG. 17 is a block diagram of still another configuration for a monitoring parameter calculation unit in the cell traffic regulation unit of FIG. 7.

In this case, the monitoring parameter calculation unit 5a has a configuration as shown in FIG. 17, in which the monitoring parameter computation unit 135 comprises a shift register 135a and a shift register control unit 135b for controlling the shift register 135a. The remaining elements are substantially similar to those in the configuration of FIG. 16. In this configuration of FIG. 17, it should be apparent that the value in the shift register 135a is increased 2n times by shifting to the left for n bits, or decreased to ½n by shifting to the right for n bits. Thus, the shift register control unit 135b carries out the operation to shift the shift register 135a as much as the product of the offset value 134 and the prescribed constant α' (or β' or γ'). Here, in cases of (a) and (b-2) it is shifted to the left, while in a case of (b-1) it is shifted to the right. The shift register 135a contains the value of the requested parameter obtained from the memory 53 of FIG. 7, and shifted by the shift register control unit 135b as described above. The resulting value of the shift register 135a is than used as a new monitoring parameter and transmitted to the selector 137. In this manner, by changing the monitoring parameters using the shift register, the processing time required for the monitoring parameter change can be reduced.

Figure 18:
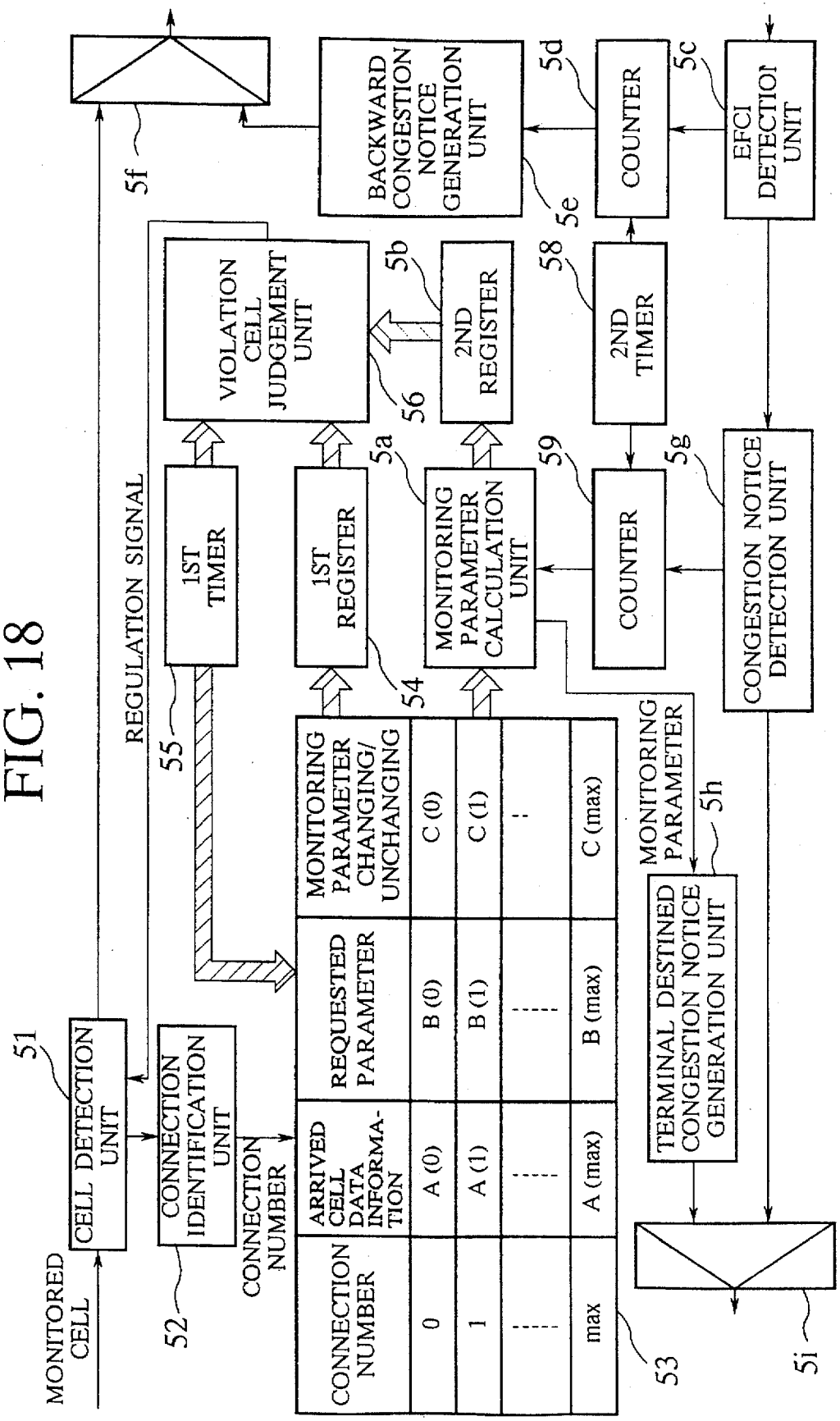
FIG. 18 is a detailed block diagram of an internal configuration of a cell traffic regulation unit used in the communication systems of FIG. 5.

Next, the cell traffic regulation unit in the configuration of FIG. 5 has a configuration as shown in FIG. 18, in which the EFCI transmitted from the node system which has fallen into the congestion state is received at the EFCI detection unit 5c corresponding to the unit 210 in FIG. 5. At this EFCI detection unit 5c, when the EFCI is set up in the received cell, the EFCI detection signal is sent to the counter 5d. This counter 5d corresponds to the unit 211 in FIG. 5 in which the counter value is updated in conjunction with the reception of the EFCI detection signal just as in the counter 59 in FIG. 7, and notifies the current counter value to the backward congestion notice generation unit 5e when the signal generated from the second timer 58 is received. The backward congestion notice generation unit 5e corresponds to the unit 212 in FIG. 5 in which the received Counter value is compared with the prescribed threshold value, and when the counter value is greater than the threshold value, the congestion notice cell is transmitted to the source terminal. Here, the congestion notice cell has a format different from the EFCI set up cell. At the element 5f, the congestion notice cell generated at the backward congestion notice generation unit 5e is inserted into the transmission path on which the monitoring by the cell traffic regulation unit is made, so as to transmit the congestion notice cell to the source terminal.

This transmitted congestion notice cell is then received by the cell traffic regulation unit (200 in FIG. 5) located between this cell traffic regulation unit and the source terminal, in which the transmitted congestion notice cell is received at the congestion notice detection unit 5g corresponding to the unit 203 in FIG. 5. This congestion notice detection unit 5g supplies the signal for notifying the reception of the congestion notice cell to the counter 59 whenever the congestion notice cell is received. The operations of the counter 59 and the monitoring parameter calculation unit 5a are the same as in the configuration of FIG. 7.

Then, the monitoring parameter value after the change which is obtained by the monitoring parameter calculation unit 5a is supplied to the terminal destined congestion notice generation unit 5h, at which the terminal destined congestion notice cell is generated by inserting the monitoring parameter value received from the monitoring parameter calculation unit 5a in this terminal destined congestion notice cell. At the element 5i, when the congestion notice cell from the congestion notice detection unit 5g and the terminal destined congestion notice cell from the terminal destined congestion notice generation unit 5h are both present and both of them are to be transmitted to the same source terminal, the congestion notice cell from the congestion notice detection unit 5g is discarded, and the terminal destined congestion notice cell from the terminal destined congestion notice generation unit 5h alone is transmitted to the source terminal. Otherwise, the terminal destined congestion notice cell from the terminal destined congestion notice generation unit 5h is inserted onto the transmission path for transmitting the congestion notice cell from the congestion notice detection unit 5g.

The remaining elements of this configuration of FIG. 18 are identical to those in the configuration of FIG. 7 described above.

Now, the exemplary applications of the congestion control scheme according to the present invention will be described.

Figure 19:
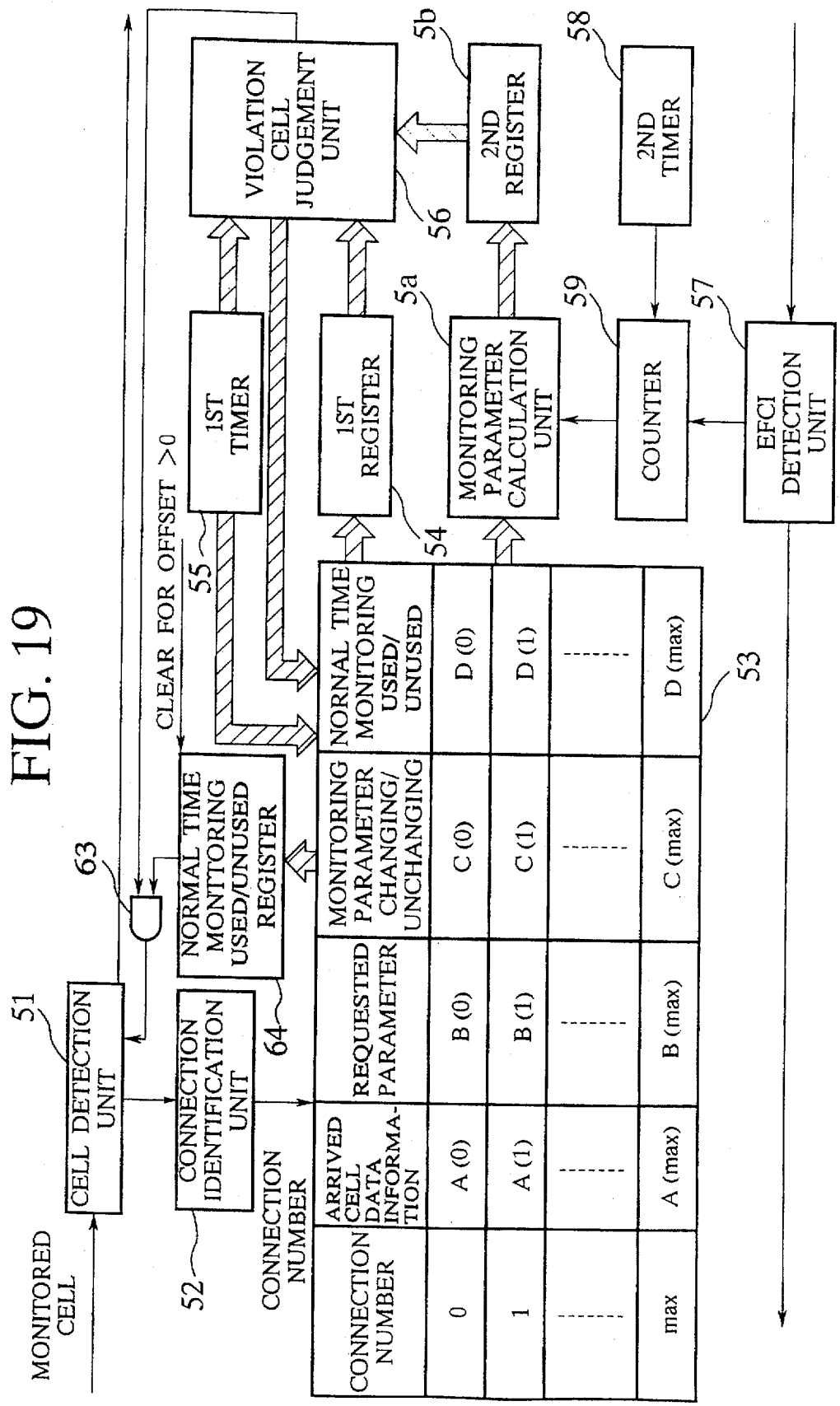
FIG. 19 is a detailed block diagram of a modified internal configuration of a cell traffic regulation unit that can be used in the communication system according to the present invention.

Among the connections, there are those connections for which the monitoring and regulation are not made at the normal time. In a case of applying the congestion control scheme of the present invention to such connections at a time of the occurrence of the congestion, the cell traffic regulation unit has a configuration as shown in FIG. 19. In this configuration of FIG. 19, the memory 53 is also provided with a normal time monitoring used/unused information indicating whether the monitoring at the normal time is to be used or not, for each connection. Then, at the cell traffic regulation unit, whether the cell belonging to the connection is a violation cell or not is judged by the violation cell judgement unit 56, and while this judgment result is transmitted from the violation cell judgement unit 56 to the cell detection unit 51, the logical product of this judgement result and the normal time monitoring used/unused information is taken by the AND gate 63. By this, if the connection to which the arrived cell belongs is a connection for which the regulation is not going to be made, the violation notice signal is not transmitted to the cell detection unit 51, and no regulation is made with respect to this arrived cell.

Here, in a case it is detected to be in the congestion state, this can be recognized from the change of the offset value calculated in the monitoring parameter calculation unit 5a, so that the value of the register 64 for holding the normal time monitoring used/unused information is cleared according to this information. In this case, the requested parameter to be registered in the memory 53 for the connection for which the monitoring is not made at the normal time is determined in advance either by the request from the terminal or at the ATM network management side. In this manner, it becomes possible to apply the congestion control in which the monitoring parameter is changed at a time of the congestion only with respect to those connections for which the monitoring is not made at the normal time.

The remaining elements of this configuration of FIG. 19 are identical to those in the configuration of FIG. 7 described above.

Also, the foregoing embodiments have been described as such that the monitoring parameter change at a time of the congestion is made with respect to all the connections which are indicated to be allowed to change the monitoring parameter at a time of the congestion by the monitoring parameter changing/unchanging information stored in the memory 53 in FIG. 7, but it is also possible to use a scheme in which the change of the monitoring parameter at a time of the congestion is made only for those connections for which the amount of cells to flow into each connection according to the requested parameter is maximum or over a prescribed value, or those connections for which the amount of cells actually flowing into each connection is maximum or over a prescribed value.

Figure 20A:
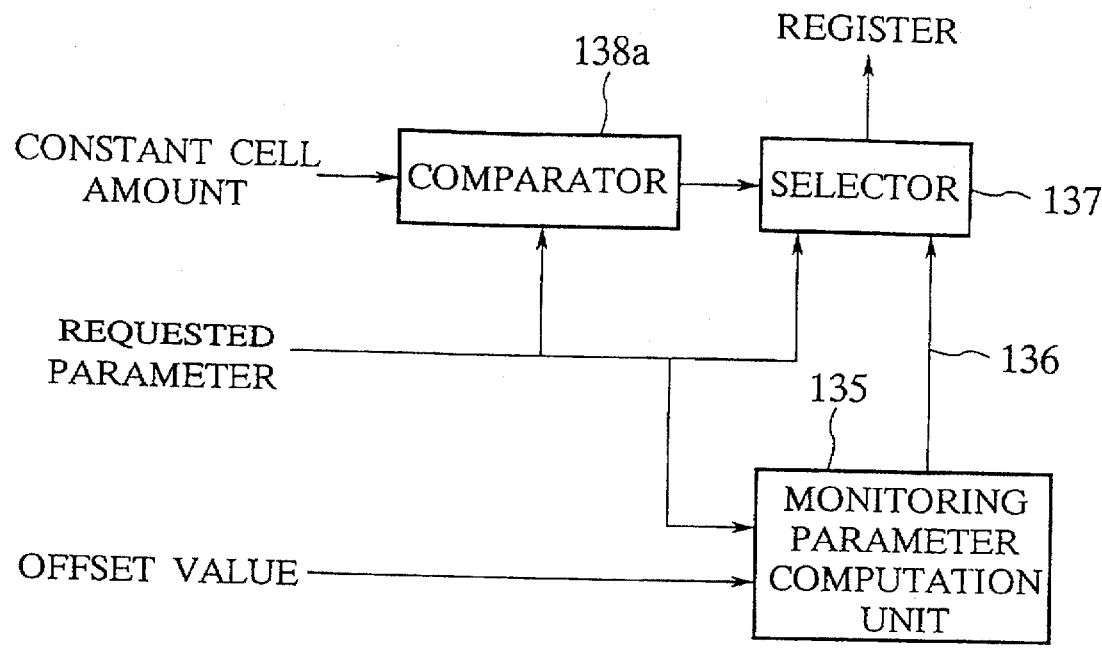
FIGS. 20A and 20B are block diagrams of modified configurations for a monitoring parameter calculation unit that can be used in the cell traffic regulation unit of the communication system according to the present invention.

For example, in a case of making the change of the monitoring parameter only with respect to those connections for which the amount of cells to flow into each connection according to the requested parameter is maximum or over a prescribed value, the monitoring parameter calculation unit 5a has a configuration as shown in FIG. 20A. Here, the configuration of FIG. 20A is based on the configuration shown in FIG. 16 for a scheme in which the change of the monitoring parameter is realized by the calculation, but it is equally possible to realize the configuration based on the configuration shown in FIG. 11 for a scheme in which the monitoring parameter candidates are stored in the memory in the similar manner.

In the configuration of FIG. 20A, the configuration of FIG. 16 is further equipped with a comparator 138a for judging the size relationship of the amount of cells to flow into the connection in a case the requested parameter stored in correspondence to each connection is used with respect to a constant cell amount such as that set up by the network manager. Namely, in a case of making the change of the monitoring parameter at a time of the congestion with respect to the connection for which the requested parameter is over a prescribed value, according to the comparison result obtained by this comparator 138a, the selector 137 selectively outputs the monitoring parameter 136 calculated by the monitoring parameter computation unit 135 when the amount of cells to flow into the connection according to the requested parameter is greater than or equal to the constant cell amount, or the requested parameter when the amount of cells to flow into the connection according to the requested parameter is less than the constant cell amount. Here, by using the maximum value of the cell amount to flow into the connection in a case the monitoring parameter used in the monitoring at the cell traffic regulation unit as the constant cell amount, it becomes possible to make the change of the monitoring parameter at a time of the congestion only with respect to the connection for which the amount of cells to flow into the connection according to the requested parameter is maximum.

Figure 20B:
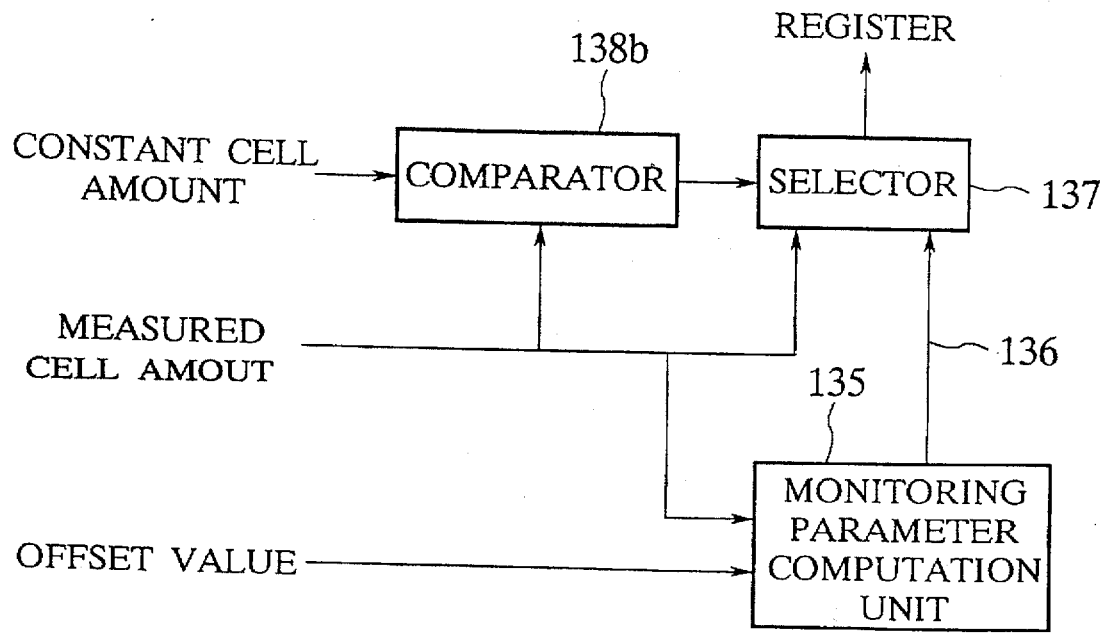

Similarly, a scheme for making the change of the monitoring parameter at a time of the congestion only with respect to those connections for which the amount of cells actually flowing into each connection is maximum or over a prescribed value can be realized by the configuration shown in FIG. 20B in which the comparator 138b compares the constant cell amount with the amount of cells actually flowing into the connection which is measured for a prescribed period of time at each connection for example.

It is also possible to provide a measure against the possible problem in the cell traffic regulation unit of the present invention as follows.

Namely, when the recovery from the congestion state is made at the cell destination, the EFCI is no longer detected at the cell traffic regulation unit, so that the offset value is going to be reduced at the monitoring parameter calculation unit 5a such that the monitoring parameter used at the cell traffic regulation unit is changed to increase the amount of cells flowing into the network compared with the present, but at this point, if the monitoring parameter is changed simultaneously for all the connections for which the monitoring is made by the cell traffic regulation unit, the number of cells transmitted to the cell destination suddenly increases such that the cell destination may fall into the congestion state again as a result. For this reason, it is possible to use a scheme in which, in a case of changing the monitoring parameter to make more cells to flow into the cell destination, the timings for changing the monitoring parameters for the connections are set to be mutually different so as to avoid the sudden increase of the number of cells transmitted to the cell destination in conjunction with the change of the monitoring parameters.

Figure 21:
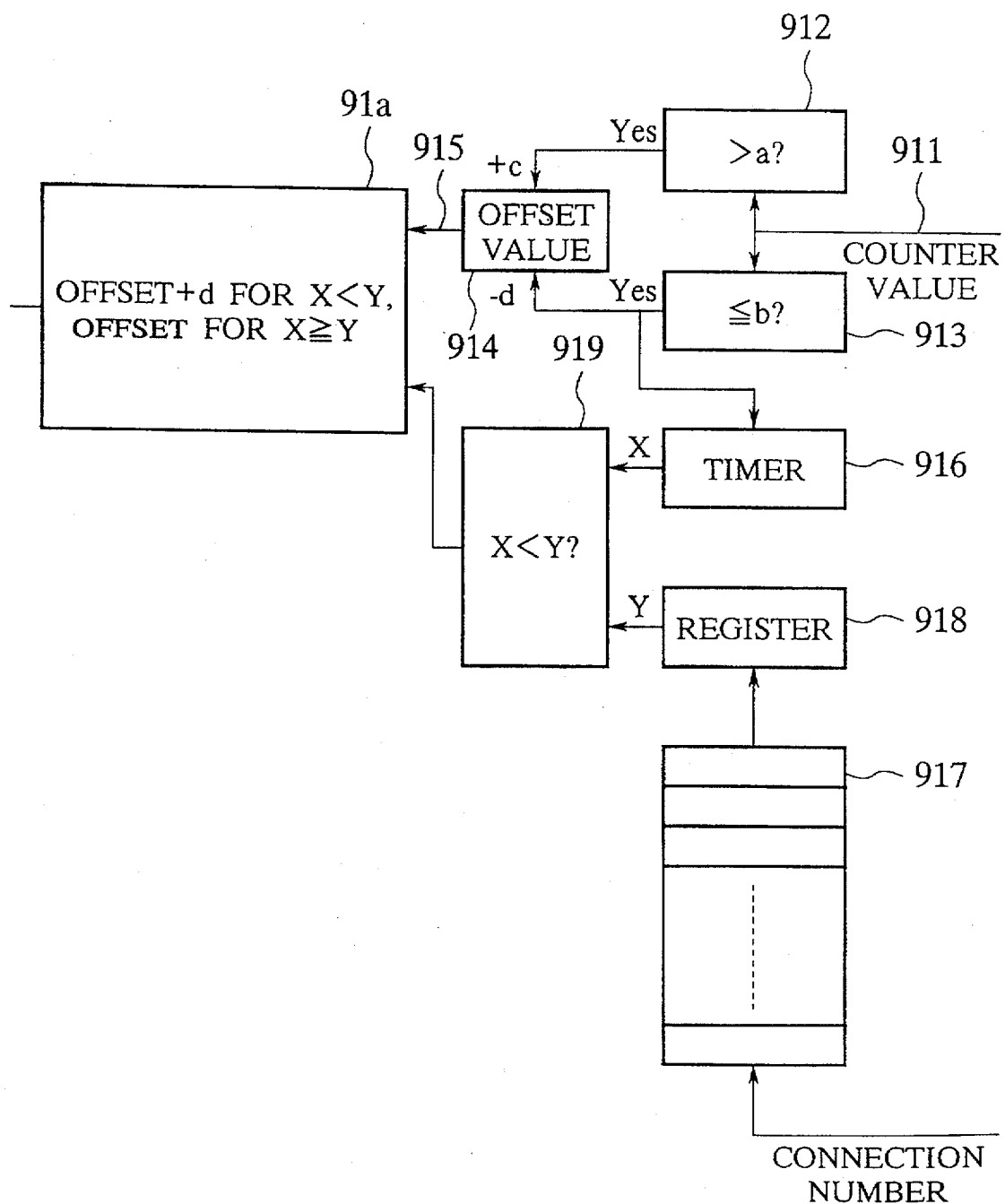
FIG. 21 is a block diagram of a modified configuration for an address pointer in the monitoring parameter calculation unit of FIG. 11.

Now, in order to realize this operation in a case of using the configuration of FIG. 11 for the monitoring parameter calculation unit 5a, the address pointer 91 has a configuration as shown in FIG. 21. It should be noted that the similar configuration can be used in a case of using the configuration of FIG. 16 for the monitoring parameter calculation unit 5a. In the configuration of FIG. 21, when the counter value 911 indicating the number of the EFCI detection signals is less than or equal to the value "b", it is going to be judged as not in the congestion state, so that the signal requesting to change the offset value is supplied from the element 913 to the element 914, and there is also provided a timer 916 which is operated to use this signal as a reset signal. By this, the elapsed time since the signal requesting to reduce the offset value is transmitted from the element 913 can be measured by this timer 916.

In addition, the delay time to be given since the offset value is reduced at the element 914 until the monitoring parameter is actually changed is stored for each connection in a memory 917. Then, by setting this value in the memory 917 to be different for different connections, it is possible to avoid the simultaneous change of the monitoring parameters for all the connections. Here, the value stored in the memory 917 may be set up in advance as a constant, or set up every time the timer 916 is reset for example by using the random number.

Then, when some cell to be monitored has arrived at the cell traffic regulation unit, the connection number obtained by the connection identification unit 52 in FIG. 7 is supplied to the memory 917 and the delay time corresponding to this connection number is written into the register 918. Then, the comparator 919 compares the value X in the timer 916 and the value Y in the register 918, and when the value X in the timer 916 is less than the value Y in the register 918, the element 91a outputs the value in which the value "d" is added to the offset value 915 to cancel out the subtracted value "d" as the offset value to be supplied to the address calculation unit 92 in FIG. 11 so as not to permit the change of the monitoring parameter until the delay time has elapsed. In this manner, the monitoring using the monitoring parameter change can be continued during the delay time. Then, when the value X in the timer 916 becomes greater than or equal to the value Y in the register 918, the element 91a outputs the offset value 915 itself as the offset value to be supplied to the address calculation unit 92 in FIG. 11 so as to permit the change of the monitoring parameter only after the delay time has elapsed.

It is also possible to use a scheme in which the EFCI detection unit 57 of the cell traffic regulation unit recognizes the destination terminal of the EFCI passing through the cell traffic regulation unit as well, such that the congestion control is made only with respect to the connection to which the cell is transmitted from that destination terminal. In this case, the cell traffic regulation unit incorporates a partial configuration as shown in FIG. 22, which shows a part related to the EFCI detection unit 57, the second timer 58, and the counter 59 in the configuration of FIG. 7 and a portion of the monitoring parameter calculation unit 5a replacing the address pointer 91 in FIG. 11.

Figure 22:
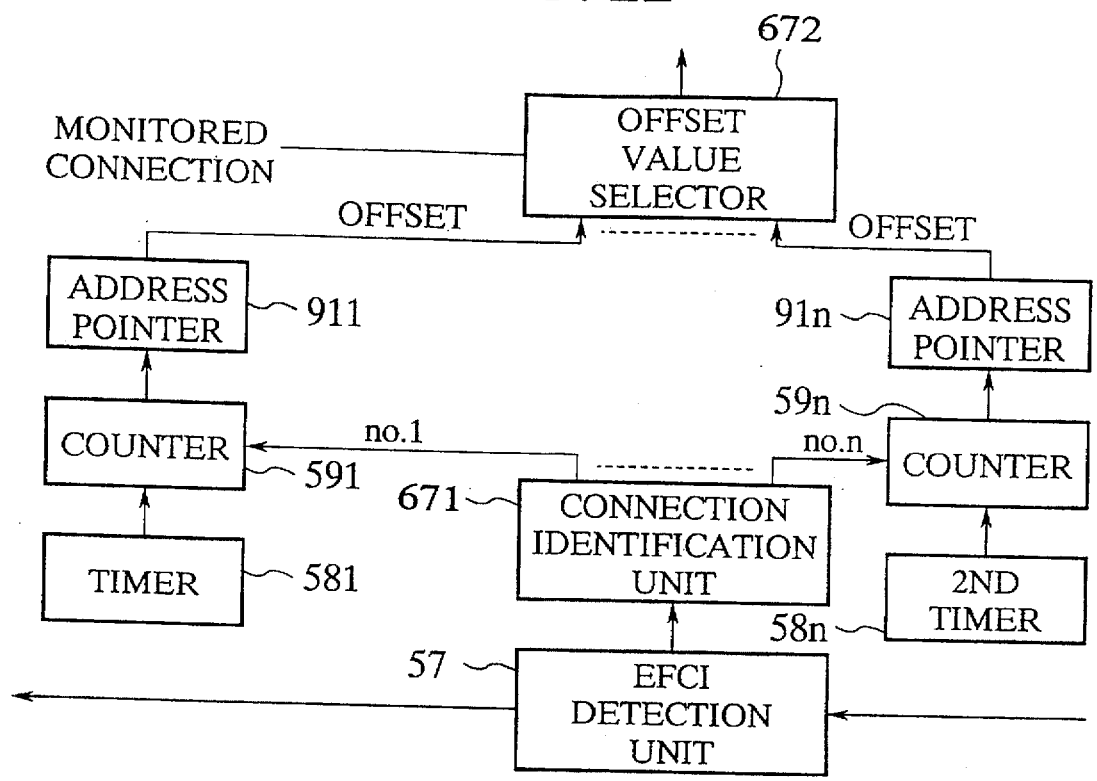
FIG. 22 is a block diagram of one possible modified partial configuration for a part of the cell traffic regulation unit in the communication system according to the present invention.

In this configuration of FIG. 22, the second timers 581 to 58n, the counters 591 to 59n, and the address pointers 911 to 91n are provided in correspondence to the n connections to make the monitoring at the cell traffic regulation unit, and there is provided a connection identification unit 671 between the EFCI detection unit 57 and the counters 591 to 59n. This connection identification unit 671 checks the connection number of the connection to which the destination terminal of the EFCI arrived at the EFCI detection unit 57 belongs, and the EFCI detection signal is transmitted only with respect to the counters corresponding to that connection. The operations of each second timer, counter, and address pointer are the same as those described above.

Then, in a case the cell to be monitored arrives at the cell traffic regulation unit, the connection number of the connection to which the arrived cell belongs can be recognized from the connection identification unit 52, so that this connection number is transmitted to the offset value selector 672. This offset value selector 672 selects the offset value corresponding to the received connection number from the address pointers 911 to 91n, and transmits the selected offset value to either the address calculation unit 92 in FIG. 11 or the monitoring parameter computation unit 135 in FIG. 16.

By using this configuration of FIG. 22, it becomes possible to make the congestion control only with respect to the connection which caused the occurrence of the congestion state in the cell destination. In other words, in this scheme, those services utilizing the connections not related to the congestion will not be affected by the congestion caused by the other connection.

Figure 23:
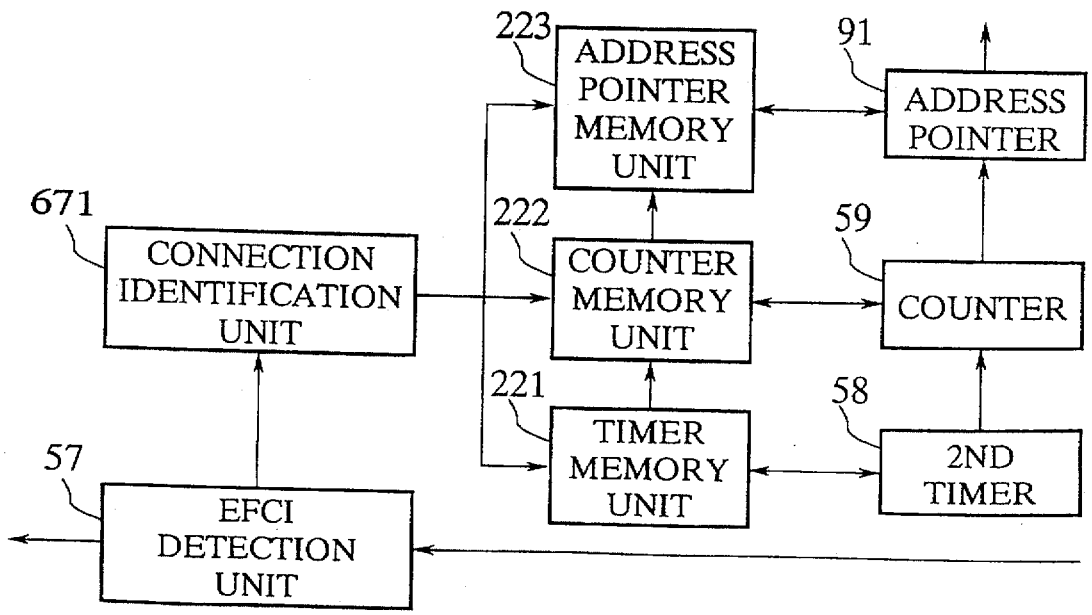
FIG. 23 is a block diagram of another possible modified partial configuration for a part of the cell traffic regulation unit in the communication system according to the present invention.

Here, the same function as realized by the configuration of FIG. 22 can also be realized by the configuration of FIG. 23 which requires a smaller hardware size. In this configuration of FIG. 23, only one set of the second timer 58, the counter 59, and the address pointer 91 is provided and used commonly for all the connections. Here, second timer value, the counter value, and the address pointer value for each connection are stored in the timer memory unit 221, the counter memory unit 222, and the address pointer memory unit 223, respectively. Then, when the connection number of the connection to which the destination terminal of the EFCI belongs is recognized at the connection identification unit 871, this connection number is transmitted to the timer memory unit 221, the counter memory unit 222, and the address pointer memory unit 223. Then, the timer memory unit 221, the counter memory unit 222, and the address pointer memory unit 223 transmit the second timer value, the counter value, and the address pointer value corresponding to the received connection number to the second timer 58, the counter 59, and the address pointer 91, respectively. When the operations at the second memory 53, the counter 59, and the address pointer 91 are finished, the second timer value, the counter value, and the address pointer value at that point are transmitted to the timer memory unit 221, the counter memory unit 222, and the address pointer memory unit 223, respectively, to update the values stored in the timer memory unit 221, the counter memory unit 222, and the address pointer memory unit 223.

By using this configuration of FIG. 23, there is no need to provide the second timer, the counter, and the address pointer for each connection separately, so that the hardware size can be reduced.

Up to here, the embodiments have been described for a case of judging whether the ATM network has fallen into the congestion state according to the number of the EFCI notice signals received within a prescribed period of time at the cell traffic regulation unit. In the following, the embodiment for judging whether the ATM network has fallen into the congestion state or not at the cell traffic regulation unit without using the EFCI set up in the cell will be described.

Figure 24:
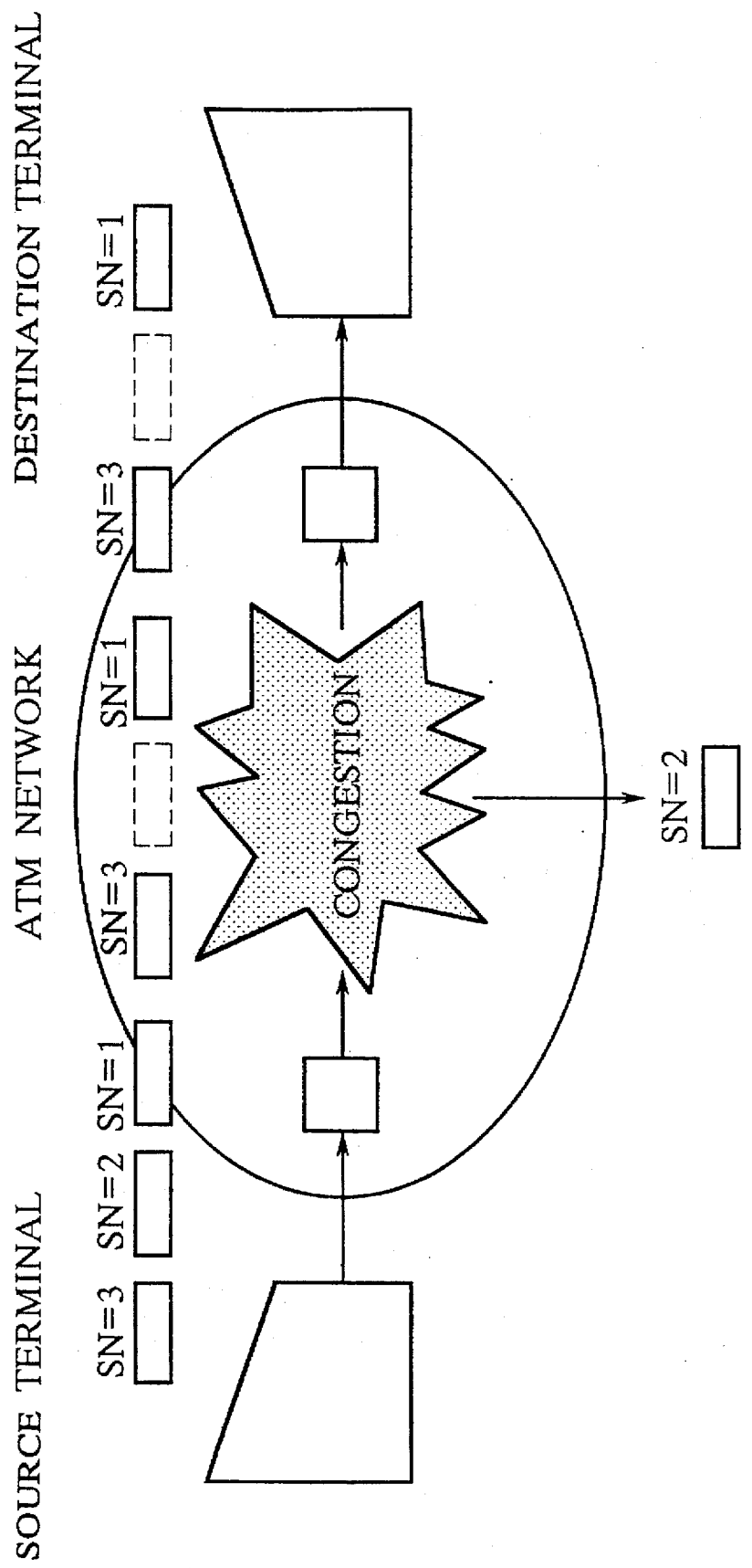
FIG. 24 is a schematic block diagram for explaining a sequence number that can be used in the communication system according to the present invention.

In a case of using one of type 1, type 2, and type 3/4 for the AAL (ATM Adaptation Layer) which is the upper later of the ATM layer, a four bits sequence number (SN) is provided within the information field (32 in FIG. 3) of the cell. As illustrated in FIG. 24, this SN is used for detecting the presence or absence of the cell loss etc. occurring in the ATM network, by giving the serial number to the SN field at a time of cell assembling the data at the AAL of the source side and checking the SN at the AAL of the destination side. In other words, by monitoring this SN (at the AAL of the destination side in the conventional scheme), it is possible to recognize the occurrence of the buffer overflow which causes the cell loss, i.e., the occurrence of the congestion state in the ATM network. In the present invention, by adding the function to recognize this SN to the cell traffic regulation unit, it can be made possible to judge whether the ATM network has fallen into the congestion state or not at the cell traffic regulation unit.

Figure 25:
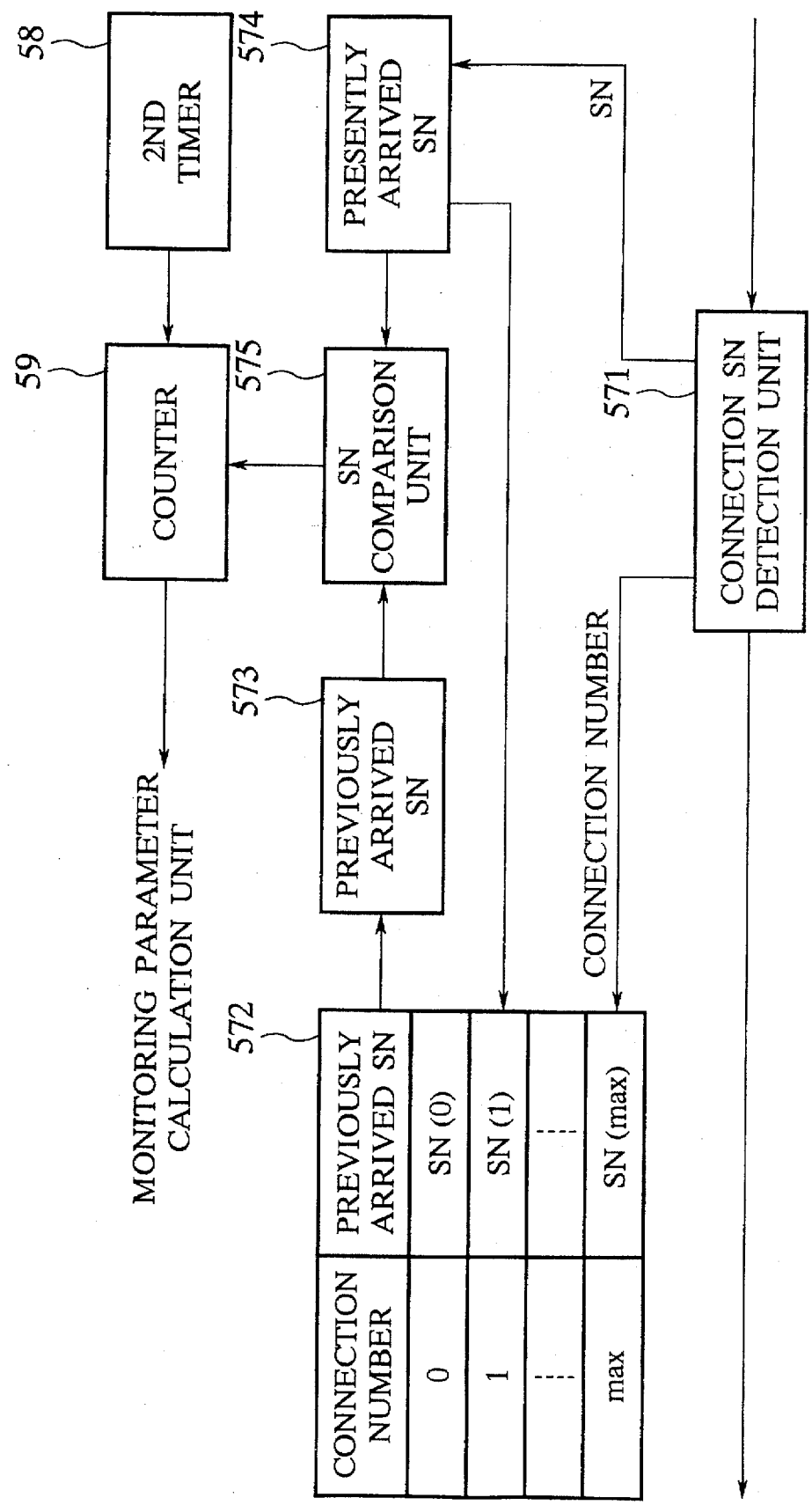
FIG. 25 is a block diagram of still another possible modified partial configuration for a part of the cell traffic regulation unit in the communication system according to the present invention in a case of using the sequence number.

In this case of using the SN for judging the congestion state, the cell traffic regulation unit incorporates a partial configuration as shown in FIG. 25, which only shows a part replacing the EFCI detection unit 57 in the configuration of FIG. 7 for a case of judging the congestion state by using the EFCI. In this configuration of FIG. 25, when the cell transmitted from the cell destination is received at the connection SN detection unit 571, the connection number registered in the header of that cell and the SN registered in the information field of that cell are detected by the connection SN detection unit 571. The connection number detected by this connection SN detection unit 571 is then supplied to the memory 572 to read out the previously arrived SN from the address corresponding to that connection number, which is then stored in the element 573. On the other hand, the presently arrived SN detected by the connection SN detection unit 571 is separately stored in the element 574, and the SN comparison unit 575 compares the previously arrived SN in the element 573 with the presently arrived SN in the element 574.

Here, the source side attaches the continuous serial numbers as the SN, so that the previously arrived SN in the element 573 and the presently arrived SN in the element 574 should take the continuous values. Thus, when the values in the elements 573 and 574 are not continuous, it is judged that the cell has been discarded due to the congestion of the ATM network, and this is notified from the SN comparison unit 575 to the counter 59. Then, when this judgement is made, the presently arrived SN in the element 574 is overwritten into the position of the previously arrived SN corresponding to the connection number to which the arrived cell belongs within the memory 572. Here, the operations of the remaining part of the cell traffic regulation unit are identical to those in FIG. 7 for a case of judging the congestion state by using the EFCI. Also, when the congestion state is recognized, the regulation to change the monitoring speed with respect to the AAL type 5 connections can be made for example.

Apart from the schemes for judging the congestion state by recognizing the EFCI or the SN at the cell traffic regulation unit, it is also possible to judge the congestion state of the ATM network at the cell traffic regulation unit as follows. Namely, when a group of data before the cell assembling at the AAL are regarded as a frame, as the congestion occurs in the ATM network, there is a case in which the transfer protocol for carrying out the control to set up the data (ECN: Explicit Congestion Notice) for notifying the congestion to the frame is used at the upper layer as in the case of the frame relay. In this case, the ECN cannot be recognized at the ATM layer level, so that it is possible to use a scheme in which the congestion control is carried out at the cell traffic regulation unit by judging whether the ATM network has fallen into the congestion state or not by a device capable of recognizing the ECN such as the terminal and by notifying this judgement result to the cell traffic regulation unit by using the signaling or the OAM flow such as the F4 flow or the F5 flow.

As described, according to the present invention, by changing the threshold value used in the monitoring at the cell traffic regulation unit which monitors the amount of the transmitted communication data in conjunction with the presence or absence of the congestion state in the destination of the communication data, it becomes possible to reduce the amount of communication data flowing into the node system or the communication network which has fallen into the congestion state by the control at the lower layer level for the communication data transfer, so that the recovery from the congestion state can be expected without providing a special controlling at the upper layer for the purpose of recovering from the congestion state occurred at the destination of the communication data.

Figure 26A:
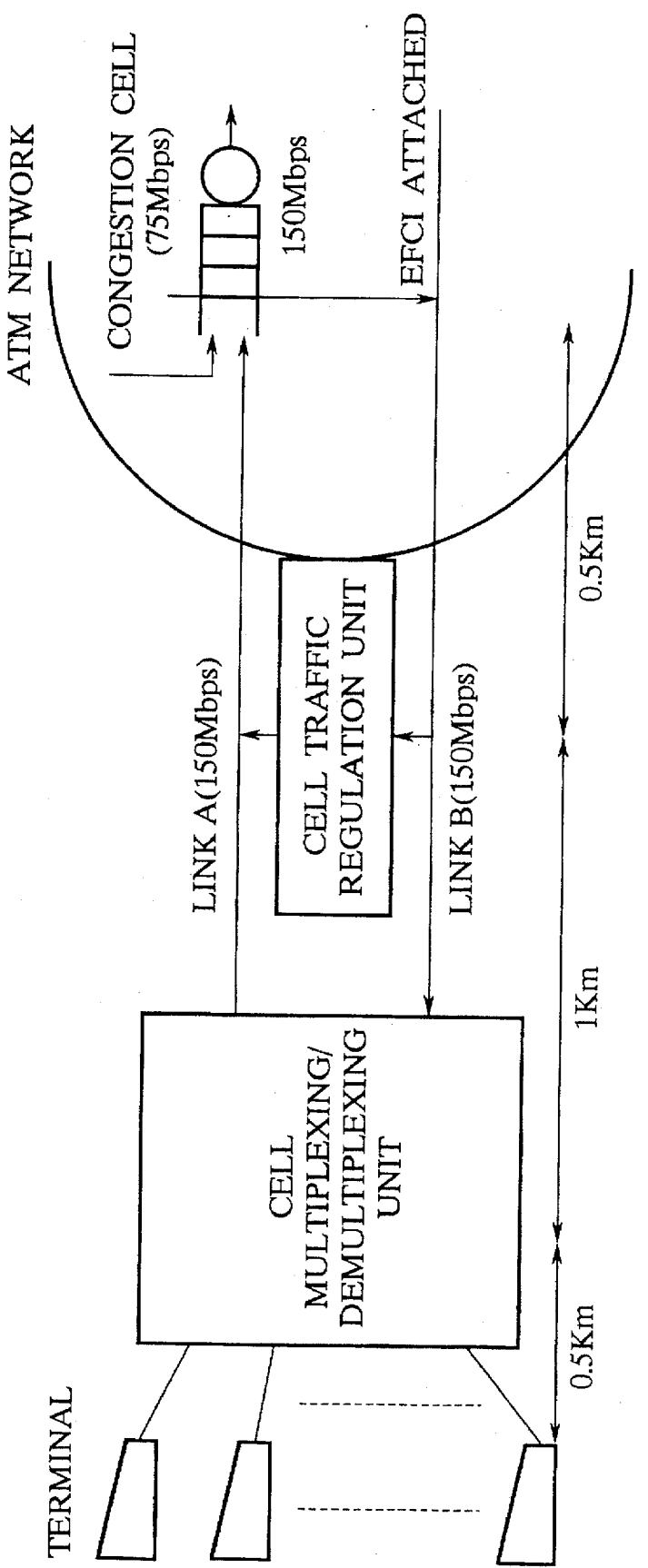
FIG. 26A is a simulation model configuration used in confirming the effect of the present invention.
Figure 26B:
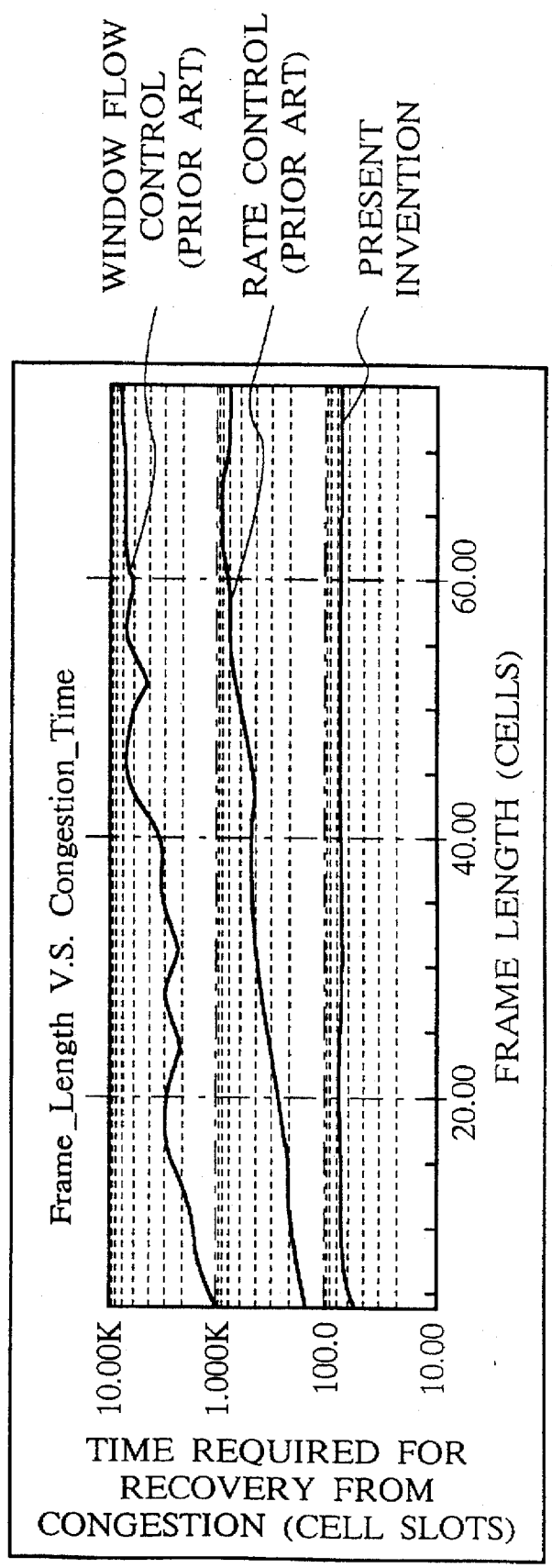
FIG. 26B is a graph showing a simulation result obtained by using the simulation model configuration of FIG. 26A.

In addition, according to the present invention, it becomes possible to make the recovery from the congestion state at a higher speed compared with the conventional scheme by carrying out the congestion control within the node system or the communication network which has fallen into the congestion state. This fact is confirmed by the simulation of the time required from the occurrence of the congestion state to the recovery in the model configuration shown in FIG. 26A, the result of which is shown in FIG. 26B for a case of using the present invention as well as for cases of using the conventional control schemes of the window flow control and the rate control at the terminals, where the horizontal axis represents the frame length (i.e., a number of cells constituting one frame) while the vertical axis represents the time required for the recovery from the congestion expressed in units of cell slots, i.e., a time required for transmitting one cell. In the simulation model of FIG. 26A, 1 cell slots is equal to 2.8 µs. It can be clearly seen in FIG. 28B that the recovery from the congestion becomes much faster by using the present invention compared with these conventional schemes.

Furthermore, according to the present invention, it also becomes possible to protect the network from the congestion occurring at the connecting target side, as well as to provide the priority levels with respect to the congestion control among different connections, as described above.

It is to be noted here that the embodiments described above for a case of using the EFCI are equally valid for a case of using the explicit backward congestion notice or the control cell for notifying the occurrence of the congestion as well.

It is also to be noted here that, besides those already mentioned above, many modifications and variations of the above embodiments may be made without departing from the novel and advantageous features of the present invention. Accordingly, al such modifications and variations are intended to be included within the scope of the appended claims.

What is claimed is:

1. A method for controlling congestion in a communication network formed by a plurality of node systems including first and second node systems, comprising the steps of:
   monitoring and regulating a flow of communication data transmitted from the first node system to the second node system by using a monitoring parameter;
   detecting a congestion in the second node system according to communication data transmitted from the second node system to the first node system; and
   changing the monitoring parameter used at the monitoring and regulating step according to the detected congestion in the second node system, such that an amount of communication data flowing into the second node system is regulated by the monitoring and regulating step using the changed monitoring parameter, irrespective of an amount of communication data transmitted by the first node system.

2. The method of claim 1, wherein at the changing step, the monitoring parameter is changed to reduce the amount of communication data flowing into the second node system when the congestion in the second node system is detected at the detecting step.

3. The method of claim 1, wherein at the changing step, the monitoring parameter is changed to increase the amount of communication data flowing into the second node system when the detection of the congestion in the second node system at the detecting step is stopped.

4. The method of claim 1, further comprising the step of notifying the monitoring parameter changed at the changing step to the first node system side.

5. The method of claim 1, wherein at the monitoring and regulating step, the monitoring parameter is based on a parameter for indicating a quality of service requested from first node system to the communication network in advance, in view of which the flow of communication data is regulated.

6. The method of claim 1, wherein at the monitoring and regulating step, connections for transmitting the communication data from the first node system to the second node system are also monitored, and the flow of communication data is regulated for each monitored connection separately.

7. The method of claim 1, wherein at the detecting step, the congestion in the second node system is detected by detecting a presence of a communication data with congestion notice indicating the congestion, which is transmitted from the second node system to the first node system.

8. The method of claim 7, wherein the communication data with congestion notice is given in a form of any one of: a control cell, generated at the second node system, for notifying the first node system of congestion in the second node system; a communication data with an explicit backward congestion indication included therein; and a communication data with an explicit forward congestion indication (EFCI) included therein.

9. The method of claim 7, wherein at the changing step, the monitoring parameter is changed by selecting one of a plurality of pre-stored monitoring parameter values according to an amount of communication data with congestion notice.

10. The method of claim 7, wherein at the changing step, the monitoring parameter is changed by calculating a function specifying a new monitoring parameter value according to an amount of communication data with congestion notice.

11. The method of claim 7, wherein at the changing step, the monitoring parameter is changed by shifting a shift register value of a shift register for indicating the monitoring parameter according to a quantity corresponding to the communication data with congestion notice.

12. The method of claim 1, wherein at the changing step, the monitoring parameter is changed at different timings for different connections between the first and second node systems.

13. The method of claim 1, wherein at the changing step, the monitoring parameter is changed differently for different connections between the first and second node systems.

14. The method of claim 1, wherein at the changing step, the monitoring parameter is changed only for those connections between the first and second node systems for which no quality of service is requested.

15. The method of claim 1, wherein at the changing step, the monitoring parameter is changed only for such a connection between the first and second node systems for which an amount of communication data flowing into the second node system according to a requested parameter exceeds a prescribed level.

16. The method of claim 1, wherein at the changing step, the monitoring parameter is changed only for such a connection between the first and second node systems for which an amount of communication data flowing into the second node system according to a requested parameter is maximum.

17. The method of claim 1, wherein at the changing step, the monitoring parameter is changed only for such a connection between the first and second node systems for which an actually measured amount of communication data flowing into the second node system exceeds a prescribed level.

18. The method of claim 1, wherein at the monitoring and regulating step, the flow of communication data transmitted from the first node system to the second node system is regulated only for those connections between the first and second node systems which are indicated to be monitored normally when the congestion in the second node system is not detected at the detecting step, whereas the flow of communication data transmitted from the first node system to the second node system is regulated for all connections between the first and second node systems when the congestion in the second node system is detected at the detecting step.

19. The method of claim 1, wherein at the detecting step, the congestion in the second node system is detected by detecting sequence numbers attached to the communication data transmitted from the second node system for each connection between the first and second node systems.

20. The method of claim 1, further comprising the step of notifying the first node system side that a change occurs in the monitoring parameter.

21. An apparatus for controlling congestion in a communication network formed by a plurality of node systems including first and second node systems, comprising:

monitoring and regulating means for monitoring and regulating a flow of communication data transmitted from the first node system to the second node system by using a monitoring parameter;

congestion detection means for detecting a congestion in the second node system according to communication data transmitted from the second node system to the first node system; and control means for changing the monitoring parameter used in the monitoring and regulation means according to the detected congestion in the second node system, such that an amount of communication data flowing into the second node system is regulated by the monitoring and regulating means using the changed monitoring parameter, irrespective of an amount of communication data transmitted by the first node system.

22. The apparatus of claim 21, wherein the control means changes the monitoring parameter to reduce the amount of communication data flowing into the second node system when the congestion in the second node system is detected by the congestion detection means.

23. The apparatus of claim 21, wherein the control means changes the monitoring parameter to increase the amount of communication data flowing into the second node system when the detection of the congestion in the second node system by the congestion detection means is stopped.

24. The apparatus of claim 21, wherein the control means also notifies the monitoring parameter by the control means to the first node system.

25. The apparatus of claim 21, wherein the monitoring and regulating means uses the monitoring parameter which is based on a parameter for indicating a quality of service requested from the first node system to the communication network in advance, in view of which the flow of communication data is regulated.

26. The apparatus of claim 21, wherein the monitoring and regulating means also monitors connections for transmitting the communication data from the first node system to the second node system, and regulates the flow of communication data for each monitored connection separately.

27. The apparatus of claim 21, wherein the congestion detection means detects the congestion in the second node system by detecting a presence of a communication data with congestion notice indicating the congestion, which is transmitted from the second node system to the first node system.

28. The apparatus of claim 27, wherein the communication data with congestion notice is given in a form of any one of: a control cell, generated at the second node system, for notifying the first node system of the congestion; a communication data with an explicit backward congestion indication included therein; and a communication data with an explicit forward congestion indication (EFCI) included therein.

29. The method of claim 27, wherein the control means changes the monitoring parameter by selecting one of a plurality of pre-stored monitoring parameter values according to an amount of communication data with congestion notice.

30. The method of claim 27, the control means changes the monitoring parameter by calculating a function specifying a new monitoring parameter value according to an amount of communication data with congestion notice.

31. The apparatus of claim 27, wherein the control means changes the monitoring parameter by shifting a shift register value of a shift register for indicating the monitoring parameter according to a quantity corresponding to the communication data with congestion notice.

32. The apparatus of claim 21, wherein the control means changes the monitoring parameter at different timings for different connections between the first and second node systems.

33. The apparatus of claim 21, wherein the control means changes the monitoring parameter differently for different connections between the first and second node systems.

34. The apparatus of claim 21, wherein the control means changes the monitoring parameter only for those connections between the first and second node systems for which no quality of service is requested.

35. The apparatus of claim 21, wherein the control means changes the monitoring parameter only for such a connection between the first and second node systems for which an amount of communication data flowing into the second node system according to a requested parameter exceeds a prescribed level.

36. The apparatus of claim 21, wherein the control means changes the monitoring parameter only for such a connection between the first and second node systems for which an amount of communication data flowing into the second node system according to a requested parameter is maximum.

37. The apparatus of claim 21, wherein the control means changes the monitoring parameter only for such a connection between the first and second node systems for which an actually measured amount of communication data flowing into the second node system exceeds a prescribed level.

38. The apparatus of claim 21, wherein the monitoring and regulating means regulates the flow of communication data transmitted from the first node system to the second node system only for those connections between the first and second node systems which are indicated to be monitored normally when the congestion in the second node system is not detected by the congestion detection means, whereas the monitoring and regulating means regulates the flow of communication data transmitted from the first node system to the second node system for all connections between the first and second node systems when the congestion in the second node system is detected by the congestion detection means.

39. The apparatus of claim 21, wherein the congestion detection means detects the congestion in the second node system by detecting sequence numbers attached to the communication data transmitted from the second node system for each connection between the first and second node systems.

40. The apparatus of claim 21, further comprising:
a detection unit for detecting a presence of the communication data transmitted from the first node system to the second node system and regulating the flow of communication data transmitted from the first node system to the second node system;
a connection identification unit for identifying a connection to which the communication data detected by the detection unit belongs;
a memory unit for storing data for each connection including at least an arrived communication data indicating previously arrived communication data of each connection, a requested parameter of each connection, and a monitoring parameter changing/unchanging data for each connection indicating whether or not a change of the monitoring parameter for said each connection is permitted;
a congestion notice detection unit for detecting a presence of a congestion notice set in the communication data transmitted from the second node system;
a counter unit for counting a number of communication data with congestion notice detected by the congestion notice detection unit;
a monitoring parameter calculation unit for calculating a new monitoring parameter value according to the data for each connection read out from the memory unit according to the connection identified by the connection identification unit and the number of communication data with congestion notice counted by the counting unit; and
a violation communication data judgment unit for making a judgement as to whether or not the communication data detected by the detection unit is a violation communication data according to the data for each connection read out from the memory unit in accordance with the connection identified by the connection identification unit and the new monitoring parameter value calculated by the monitoring parameter calculation unit, and controlling the detection unit to regulate the flow of communication data according to the judgement.

41. The apparatus of claim 21, wherein the control means includes means for notifying the first node system side that a change occurs in the monitoring parameter.

42. The apparatus of claim 21, wherein the monitoring and regulating means comprises:
a detection unit for detecting the communication data transmitted from the first node system to the second node system and regulating the flow of first communication data transmitted from the first node system to the second node system;
a connection identification unit for identifying a connection to which the communication data detected by the detection unit belongs; and
a memory unit for storing data for each connection including at least an arrived communication data indicating previously arrived communication data of each connection, a requested parameter of each connection, and a monitoring parameter changing/unchanging data for each connection indicating whether or not a change of a monitoring parameter for said each connection is permitted;
wherein the congestion detection means comprises:
a congestion notice detection unit for detecting a congestion notice in the communication data transmitted from the second node system;
wherein the control means comprises:
a monitoring parameter calculation unit for calculating a new monitoring parameter value according to the data for each connection read out from the memory unit according to the connection identified by the connection identification unit; and
wherein the monitoring and regulating means further comprises:
a violation communication data judgment unit for making a judgment as to whether or not the communication data detected by the detection unit is a violating communication data according to the data for each connection read out from the memory unit in accordance with the connection identified by the connection identification unit and the new monitoring parameter value calculated by the monitoring parameter calculation unit, and controlling the detection unit to regulate the flow of communication data according to the judgment.

43. A method for controlling congestion in a communication network connected with a terminal, comprising the steps of:
monitoring and regulating a flow of communication data transmitted from the terminal to the communication network by using a monitoring parameter;
detecting a congestion in the communication network according to communication data transmitted from the communication network to the terminal; and
changing the monitoring parameter used at the monitoring and regulating step according to a detection of the congestion in the communication network at the detecting step, such that an amount of communication data flowing into the communication network is regulated by the monitoring and regulating step using the changed monitoring parameter, irrespective of an amount of communication data transmitted by the terminal.

44. An apparatus for controlling congestion in a communication network connected with a terminal; comprising:
monitoring and regulating means for monitoring and regulating a flow of communication data transmitted from the terminal to the communication network by using a monitoring parameter;
congestion detection means for detecting a congestion in the communication network according to communication data transmitted from the communication network to the terminal; and
control means for changing the monitoring parameter used in the monitoring and regulating means according to a detection of the congestion in the communication network by the congestion detection means, such that an amount of communication data flowing into the communication network is regulated by the monitoring and regulating means using the changed monitoring parameter, irrespective of an amount of communication data transmitted by the terminal.

45. A method for controlling congestion in a communication network formed by a plurality of node systems including first and second node systems, comprising the steps of:

monitoring and regulating a flow of communication data transmitted from the first node system to the second node system by using a monitoring parameter;

detecting a congestion in the second node system according to an amount of communication data temporarily stored in a buffer which is transmitted from the first node system; and changing the monitoring parameter used at the monitoring and regulating step according to a detection of the congestion in the second node system at the detecting step, such that an amount of communication data flowing into the second node system is regulated by the monitoring and regulating step using the changed monitoring parameter, irrespective of an amount of communication data transmitted by the first node system.

46. An apparatus for controlling congestion in a communication network formed by a plurality of node systems including first and second node systems, comprising:

monitoring and regulating means for monitoring and regulating a flow of communication data transmitted from the first node system to the second node system by using a monitoring parameter;

congestion detection means for detecting a congestion in the second node system according to communication data temporarily stored in a buffer which is transmitted from the first node system; and control means for changing the monitoring parameter used in the monitoring and regulating means according to a detection of the congestion in the second node system by the congestion detection means, such that an amount of communication data flowing into the second node system is regulated by the monitoring and regulating means using the changed monitoring parameter, irrespective of an amount of communication data transmitted by the first node system.

47. The apparatus of claim 46, wherein the monitoring and regulating means, the congestion detection means, and the control means are provided within the second node system.

48. A method for controlling congestion in a communication network formed by a plurality of node systems including first, second, and third node systems, comprising the steps of:

monitoring and regulating a flow of communication data transmitted from the first node system to the second node system by using a monitoring parameter;

detecting a congestion in the second node system according to a backward congestion notice provided in the communication data flowing out from the second node system to the first node system;

changing the monitoring parameter used at the monitoring and regulating step according to a detection of the congestion in the second node system, such that an amount of communication data flowing into the second node system is regulated by the monitoring and regulating step using the changed monitoring parameter, irrespective of an amount of communication data transmitted by the first node system;

detecting a forward congestion notice provided in the communication data transmitted from the second node system to the third node system when the congestion occurs in the second node system; and generating the backward congestion notice, indicating the congestion in the second node system, in the communication data transmitted from the third node system to the first and second node systems, according to the detected forward congestion notice.

49. An apparatus for controlling congestion in a communication network formed by a plurality of node systems including first, second, and third node systems, comprising:

a first regulation unit provided between the first and second node systems, including:

monitoring and regulating means for monitoring and regulating a flow of communication data transmitted from the first node system to the second node system by using a monitoring parameter;

congestion detection means for detecting a congestion in the second node system according to a backward congestion notice provided in the communication data flowing out from the second node system to the first node system; and control means for changing the monitoring parameter used in the monitoring and regulating means according to a detection of the congestion in the second node system by the congestion detection means; and a second regulation unit provided between the second and third node systems, including:

forward congestion notice detection means for detecting a forward congestion notice provided in the communication data transmitted from the second node system to the third bode system when the congestion occurs in the second node system; and backward congestion notice generation means for generating the backward congestion notice, indicating the congestion in the second node system, in the communication data transmitted from the third node system to the first and second node systems, according to the forward congestion notice detected by the forward congestion notice detection means.

50. A method for controlling congestion in a communication network formed by a plurality of node systems including first and second node systems, comprising the steps of:

detecting a congestion in the second node system;

in response to the detected congestion in the second node system, changing a monitoring parameter which is used to determine whether a cell from the first node system is violating or not; and monitoring and regulating a flow of communication data transmitted from the first node system to the second node system by using the changed monitoring parameter, such that an amount of communication data flowing into the second node system is regulated irrespective of an amount of communication data transmitted by the first node system.

51. The method of claim 50, wherein the detecting is performed according to communication data transmitted from the second node system.

52. An apparatus for controlling congestion in a communication network formed by a plurality of node systems including first and second node systems, said apparatus being located external to a source node system from which communication data is originally outputted, comprising:

a monitoring and regulating system configured to monitor and regulate a flow of the communication data that is transmitted from the first node system to the second node system by using a monitoring parameter;

a congestion detection system configured to detect a congestion in the second node system according to communication data transmitted from the second node system to the first node system; and a control system configured to change the monitoring parameter in the monitoring and regulating system according to the detected congestion in the second node system, such that an amount of communication data flowing into the second node system is regulated by the monitoring and regulating system using the changed monitoring parameter, irrespective of an amount of communication data transmitted by the first node system.

53. An apparatus for controlling congestion in a communication network formed by a plurality of node systems including first and second node systems, comprising:

a monitoring and regulating system configured to monitor and regulate a flow of communication data transmitted from the first node system to the second node system based on a monitoring parameter, the monitoring parameter being used to determine violating and non-violating cells received from the first node system;

a congestion detection system configured to detect a congestion in the second node system according to communication data transmitted from the second node system; and a control system configured to change the monitoring parameter in the monitoring and regulating system according to the detected congestion in the second node system, such that an amount of communication data flowing into the second node system is regulated by the monitoring and regulating system using the changed monitoring parameter, irrespective of an amount of communication data transmitted by the first node system.

54. An apparatus for controlling congestion in a communication network formed by a plurality of node systems including first and second node systems, said apparatus being located external to a source node system from which communication data is originally outputted, comprising:

a monitoring and regulating unit configured to monitor and regulate a flow of communication data transmitted from the first node system to the second node system by using a monitoring parameter;

a congestion detection unit configured to detect a congestion in the second node system according to communication data transmitted from the second node system to the first node system; and a control unit configured to change the monitoring parameter in the monitoring and regulation unit according to the detected congestion in the second node system, such that an amount of communication data flowing into the second node system is regulated by the monitoring and regulating unit using the changed monitoring parameter, irrespective of an amount of communication data transmitted by the first node system.

55. A method for controlling congestion in a communication network formed by a plurality of node systems including first and second node systems, comprising the steps of:

detecting a congestion in the second node system;

in response to the detected congestion in the second node system, changing a monitoring parameter used for monitoring and regulating communication data; and monitoring and regulating a flow of communication data transmitted from the first node system to the second node system by using the changed monitoring parameter, such that an amount of communication data flowing into the second node system is regulated irrespective of an amount of communication data transmitted by the first node system, wherein the communication data transmitted from the first node system is originally transmitted from a source node system, and wherein the monitoring and regulating of the monitoring and regulating step are performed external to the source node system.

56. The method of claim 55, wherein the congestion is detected according to communication data transmitted from the second node system.

57. An apparatus for controlling congestion in a communication network formed by a plurality of node systems including first and second node systems, comprising:

a congestion detecting unit configured to detect a congestion in the second node system;

a changing unit configured to change a monitoring parameter according to the detected congestion in the second node system to determine whether a cell received from the first node system is violating or not; and a monitoring and regulating unit configured to monitor and regulate a flow of communication data transmitted from the first node system to the second node system by using the changed monitoring parameter, such that an amount of communication data flowing into the second node system is regulated irrespective of an amount of communication data transmitted by the first node system.

58. The apparatus of claim 57, wherein the congestion detecting unit performs the detecting according to communication data transmitted from the second node system.

59. A method for controlling congestion in a communication network connected with a terminal, comprising the steps of:

detecting congestion in the communication network;

in response to the detected congestion in the communication network, changing a monitoring parameter; and monitoring and regulating a flow of communication data transmitted from the terminal to the communication network by using the changed monitoring parameter, such that an amount of communication data flowing into the communication network is regulated irrespective of an amount of communication data transmitted by the terminal.

60. The method of claim 59, wherein the detecting is performed according to communication data transmitted from the communication network.

61. The method of claim 59, wherein the monitoring parameter is used to determine whether a cell transmitted from the terminal is violating or not.

62. The method of claim 59, wherein the monitoring and regulating are performed external to the terminal.

63. A method for controlling congestion in a communication network formed by a plurality of node systems including first and second node systems, comprising the steps of:

detecting a congestion in the second node system according to an amount of communication data temporarily stored in a buffer which is transmitted which is from the first node system;

in response to the detected congestion in the second node system, changing a monitoring parameter; and monitoring and regulating a flow of communication data transmitted from the first node system to the second node system by using the changed monitoring parameter, such that an amount of communication data flowing into the second node system is regulated irrespective of an amount of communication data transmitted by the first node system.

64. A method for controlling congestion in a communication network formed by a plurality of node systems including first and second node systems, comprising the steps of:

detecting a congestion in the second node system;

in response to the detected congestion in the second node system, changing a monitoring parameter; and monitoring and regulating a flow of communication data transmitted from the first node system to the second node system by using the changed monitoring parameter, such that an amount of communication data flowing into the second node system is regulated irrespective of an amount of communication data transmitted by the first node system.

* * * * *